(12) United States Patent
Hansen

(10) Patent No.: US 11,347,881 B2
(45) Date of Patent: May 31, 2022

(54) METHODS AND SYSTEMS FOR DETECTING RANSOMWARE ATTACK IN INCREMENTAL BACKUP

(71) Applicant: DATTO, INC., Norwalk, CT (US)

(72) Inventor: Kurt Hansen, Rungsted Kyst (DK)

(73) Assignee: DATTO, INC., Norwalk, CT (US)

( * ) Notice: Subject to any disclaimer, the term of this patent is extended or adjusted under 35 U.S.C. 154(b) by 241 days.

(21) Appl. No.: 16/840,665

(22) Filed: Apr. 6, 2020

(65) Prior Publication Data

US 2021/0312066 A1 Oct. 7, 2021

(51) Int. Cl.

| | |
|---|---|
| *G06F 7/04* | (2006.01) |
| *G06F 21/62* | (2013.01) |
| *G06F 16/16* | (2019.01) |
| *G06F 16/23* | (2019.01) |
| *G06F 11/14* | (2006.01) |
| *G06F 21/55* | (2013.01) |
| *G06F 21/57* | (2013.01) |

(Continued)

(52) U.S. Cl.
CPC ...... *G06F 21/6218* (2013.01); *G06F 11/1451* (2013.01); *G06F 11/1461* (2013.01); *G06F 11/1464* (2013.01); *G06F 16/162* (2019.01); *G06F 16/2322* (2019.01); *G06F 21/552* (2013.01); *G06F 21/577* (2013.01); *G06F 21/602* (2013.01)

(58) Field of Classification Search
CPC ............. G06F 11/1451; G06F 11/1461; G06F 11/1464; G06F 16/162; G06F 16/2322; G06F 21/552; G06F 21/577; G06F 21/602; G06F 21/6218

See application file for complete search history.

(56) References Cited

U.S. PATENT DOCUMENTS

| | | |
|---|---|---|
| 9,053,216 B1 | 6/2015 | Coleman et al. |
| 9,323,638 B2 | 4/2016 | Coleman et al. |

(Continued)

FOREIGN PATENT DOCUMENTS

EP 3038003 A1 6/2016

OTHER PUBLICATIONS

International Search Report for Corresponding patent application No. PCT/US2021/024861 dated Jun. 9, 2021.

(Continued)

*Primary Examiner* — Gary S Gracia
(74) *Attorney, Agent, or Firm* — Fay Sharpe LLP

(57) ABSTRACT

Ransomware attack (RWA) detection is performed during an incremental or differential backup of a system of folders or directories of a computer or network of computers via an electronic network. The RWA detection includes processing incremental or differential backup metadata acquired during the incremental or differential backup to determine whether a RWA alert is issued. RWA remediation is performed at least in part on the RWA alert being issued. The RWA alert may be issued based on processing of the incremental or differential backup metadata to identify candidate new files and candidate deleted files in which the candidate new files are candidates for being encrypted copies of the candidate deleted files. RWA alert criterion may be based on counts of new versus deleted files in a folder or directory, and comparison of file sizes of the new versus deleted files.

22 Claims, 7 Drawing Sheets

(51) Int. Cl.
*G06F 21/60* (2013.01)
*H04N 7/16* (2011.01)

(56) References Cited

U.S. PATENT DOCUMENTS

| | | | |
|---|---|---|---|
| 9,734,337 | B1 | 8/2017 | Patton |
| 9,935,973 | B2 | 4/2018 | Crofton et al. |
| 10,121,003 | B1 | 11/2018 | Adams |
| 10,229,269 | B1 | 3/2019 | Patton |
| 10,262,138 | B2 | 4/2019 | Boutnaru |
| 10,650,146 | B1 * | 5/2020 | Gaurav ............... G06F 21/562 |
| 10,878,084 | B1 * | 12/2020 | Voss .................... G06F 11/1469 |
| 11,221,921 | B2 * | 1/2022 | Zhang ................. G06F 11/1448 |
| 2010/0287383 | A1 | 11/2010 | Conte |
| 2011/0107043 | A1 | 5/2011 | Palagummi |
| 2013/0326625 | A1 | 12/2013 | Anderson |
| 2014/0040331 | A1 * | 2/2014 | Takaoka ................ G06F 3/067 707/827 |
| 2015/0254566 | A1 | 9/2015 | Chandramouli |
| 2017/0177452 | A1 | 6/2017 | Parab |
| 2017/0177867 | A1 * | 6/2017 | Crofton ................. G06F 21/565 |
| 2017/0180394 | A1 * | 6/2017 | Crofton ................... G06F 21/64 |
| 2017/0206353 | A1 | 7/2017 | Jai et al. |
| 2017/0223031 | A1 | 8/2017 | Gu |
| 2017/0364681 | A1 | 12/2017 | Roguine et al. |
| 2018/0024893 | A1 | 1/2018 | Selle |
| 2018/0075234 | A1 | 3/2018 | Boutnaru |
| 2018/0107824 | A1 | 4/2018 | Gibbons et al. |
| 2018/0115577 | A1 | 4/2018 | Shukla et al. |
| 2018/0173874 | A1 * | 6/2018 | Muttik .................... G06F 21/64 |
| 2018/0078393 | A1 | 10/2018 | Bhave |
| 2018/0288087 | A1 | 10/2018 | Hittel et al. |
| 2018/0330088 | A1 | 11/2018 | Crofton et al. |
| 2019/0108340 | A1 | 4/2019 | Bedhapudi et al. |
| 2019/0121978 | A1 * | 4/2019 | Kraemer ............... G06F 21/566 |
| 2019/0138727 | A1 * | 5/2019 | Dontov ............... H04W 12/009 |
| 2019/0158512 | A1 | 5/2019 | Zhang |
| 2019/0294507 | A1 | 9/2019 | Linnen |
| 2020/0004962 | A1 | 1/2020 | Araujo |
| 2020/0034532 | A1 * | 1/2020 | Muttik ................ G06F 11/1458 |
| 2020/0034537 | A1 | 1/2020 | Chen |
| 2020/0042703 | A1 * | 2/2020 | Herman Saffar ... G06F 11/1435 |
| 2020/0097653 | A1 * | 3/2020 | Mehta ....................... G06N 3/08 |
| 2020/0351347 | A1 * | 11/2020 | Chang ................. G06F 11/1458 |
| 2020/0387609 | A1 * | 12/2020 | Hansen ................. G06F 21/552 |

OTHER PUBLICATIONS

Scaife, et al., "CryptoLock (and Drop It): Stopping Ransomware Attacks on User Data," 2016 IEEE 36th International Conference on Distributed Computing Systems (ICDCS), Nara, 2016, pp. 303-312.
Dew Associates Corporation, NTFS Directories and Files, http://www.dewassoc.com/kbase/windows_nt/ntfs_directories_and_files.htm, 2000.
Miller, CS 537 Lecture Notes, Section 26, Windows (NT) File System, Chapter 22, Section 22.5 in Operating Systems Concepts, 2002.
Mathews, John H., Module for Monte Carlo Pi, http://mathfaculty.fullerton.edu/mathews//n2003/MonteCarloPiMod.html, 2003.
Lyda et al., Using Entropy Analysis to Find Encrypted and Packed Malware, Computer Science IEEE Security & Privacy, 2007.
Jung et al., Ransomware Detection Method Based on Context-Aware Entropy Analysis. Soft Computing 22, 6731-6740, 2018.
Christensen et al., Ransomware Detection and Mitigation Tool, Technical University of Denmark, Department of Applied Mathematics and Computer Science, 2017.
U.S. Appl. No. 16/431,188, filed Jun. 4, 2019.
Sparta et al., Using Entropy Analysis to Find Encrypted and Packed Malware, IEEE Computer Society, 2007.

* cited by examiner

```xml
<?xml version="1.0" encoding="UTF-8"?>
<desktop sequence="1575538063337" operation="update">
  <share type="folder" path="C:\test2\original-mod" name="original-mod">
    <entry type="folder" name="original-mod" date="1528383600">
      <entry type="folder" name="Offering" date="1528383599">
        <entry name="UI Review.docx" date="1575599898" size="1014322" op="update"/>
      </entry>
      <entry type="folder" name="Offsite June" date="1528383597">
        <entry name="Proposal.pdf" date="1494503519" size="114054" op="delete"/>
        <entry name="Today.pdf" date="1494503441" size="96469" op="new"/>
        <entry name="Other Proposal.pdf" date="1494415230" size="106226" op="new"/>
        <entry name="System.h" date="1494241672" size="35865" op="delete"/>
        <entry type="folder" name="Old API" date="1528383597" op="delete"/>
        <entry name="Social.xlsx" date="1496229374" size="80069" op="update" newname="social-old.xlsx"/>
        <entry name="Comparison.docx" date="1575538611" size="12278" op="update"/>
        <entry name="Overview.docx" date="1575538705" size="212655" op="update"/>
        <entry name="Usings.docx" date="1575538730" size="16575" op="update"/>
        <entry name="Specifics.pdf" date="1366038209" size="312332" op="new"/>
        <entry name="clients.pdf" date="1492777896" size="212934" op="new"/>
        <entry name="Distributor.pdf" date="1411680310" size="249392" op="new"/>
        <entry name="Solutions.pptx" date="1466621794" size="682994" op="new"/>
        <entry name="New models.xlsx" date="1466745451" size="9632" op="new"/>
        <entry name="Matrix.docx" date="1464577136" size="227986" op="new"/>
      </entry>
      <entry type="folder" name="Certificats" date="1528383599">
        <entry name="misc.docx" date="1413800049" size="45935" op="delete"/>
        <entry name="Procedures.docx" date="1390429258" size="60713" op="delete"/>
      </entry>
    </entry>
  </share>
</desktop>
```

Fig. 3

```xml
<?xml version="1.0" encoding="UTF-8"?>
<desktop sequence="15511000189274" operation="update">
  <share type="folder" path="C:\test3\Do01" name="Do01">
    <entry type="folder" name="Do01" date="15511099719">
      <entry name="- API.pdf" date="1495008997" size="93240" op="delete"/>
      <entry name="Details.pdf" date="1494946930" size="112897" op="delete"/>
      <entry name="Proposal.pdf" date="1494503519" size="114054" op="delete"/>
      <entry name="Today.pdf" date="1494503441" size="96469" op="delete"/>
      <entry name="Other Proposal.pdf" date="1494415230" size="106226" op="delete"/>
      <entry name="second Proposal.pdf" date="1494248051" size="108269" op="delete"/>
      <entry name="Comparison.docx" date="1494502156" size="182189" op="delete"/>
      <entry name="- API-pdf.axx" date="15511100783" size="88996" op="new"/>
      <entry name="Details-pdf.axx" date="15511100784" size="114221" op="new"/>
      <entry name="Proposal-pdf.axx" date="15511100784" size="115370" op="new"/>
      <entry name="Today-pdf.axx" date="15511100784" size="97723" op="new"/>
      <entry name="Other Proposal-pdf.axx" date="15511100784" size="108340" op="new"/>
      <entry name="second Proposal-pdf.axx" date="15511100784" size="110470" op="new"/>
      <entry name="Comparison-docx.axx" date="15511100785" size="154303" op="new"/>
      <entry type="folder" name="Folder1" date="15511099719">
        <entry name="Offsite notes 2016.docx" date="1475756639" size="21784" op="delete"/>
        <entry name="Manager - UI and Features.docx" date="1469010679" size="1513370" op="delete"/>
        <entry name="Solution Feature Matrix.docx" date="1466577136" size="27986" op="delete"/>
        <entry name="Solution Offsite.pptx" date="1466621794" size="6822994" op="delete"/>
        <entry name="storage status.docx" date="1475525866" size="65582" op="delete"/>
        <entry name="Model-New-HW.xlsx" date="1466765451" size="9632" op="delete"/>
        <entry name="Offsite notes 2016-docx.axx" date="15511100785" size="23484" op="new"/>
        <entry name="Manager - UI and Features-docx.axx" date="15511100785" size="1313285" op="new"/>
        <entry name="Solution Feature Matrix-docx.axx" date="15511100785" size="21557" op="new"/>
        <entry name="Solution Offsite-pptx.axx" date="15511100786" size="4348871" op="new"/>
        <entry name="storage status-docx.axx" date="15511100786" size="57669" op="new"/>
        <entry name="Model-New-HW-xlsx.axx" date="15511100786" size="11525" op="new"/>
      </entry>
      <entry type="folder" name="Folder2" date="15511099719">
        <entry name="optimizations.docx" date="1475580195" size="20062" op="delete"/>
        <entry name="optimizations-docx.axx" date="15511100786" size="21693" op="new"/>
        <entry name="Other areas of the appliction-pptx.tmp" date="15511100786" size="0" op="new"/>
      </entry>
    </entry>
  </share>
</desktop>
```

Fig. 4

METHODS AND SYSTEMS FOR DETECTING RANSOMWARE ATTACK IN INCREMENTAL BACKUP

BACKGROUND

The following relates to detecting a ransomware attack (RWA) in an incremental backup. It finds particular application in conjunction with server computers providing incremental backups, and to incremental backup methods, and to computing systems with incremental backup, and the like, and will be described with particular reference thereto. However, it is to be appreciated that the following is also amenable to other like applications.

INCORPORATION BY REFERENCE

U.S. Pub. No. 2018/0107824 filed Oct. 17, 2017 and titled "SYSTEMS AND METHODS FOR DETECTING RANSOMWARE INFECTION", first named inventor Robert John Gibbons, Jr., is incorporated by reference herein in its entirety. U.S. Pub. No. 2018/0107824 discloses, as some illustrative embodiments, systems and methods for detecting ransomware infection in filesystems. These systems and methods may enable a computer user to detect a ransomware infection within a filesystem utilizing a snapshot image-based backup. According to some embodiments, the disclosed systems and methods analyze metadata describing the contents of an examined filesystem embodied in a Master File Table (MFT). Also according to some embodiments, the disclosed systems and methods compute an entropy associated with an extracted sample of files to distinguish between infected and uninfected file systems. Relative to other techniques, the disclosed systems/methods can decrease the time and/or computational resources required to detect ransomware, while also decreasing false positives and false negatives.

U.S. Ser. No. 16/431,188 filed Jun. 4, 2019 and titled "METHODS AND SYSTEMS FOR DETECTING A RANSOMWARE ATTACK USING ENTROPY ANALYSIS AND FILE UPDATE PATTERNS", first named inventor Kurt Hansen, is incorporated by reference herein in its entirety. U.S. Ser. No. 16/431,188 discloses, as some illustrative embodiments, methods and systems for detecting a ransomware infection in one or more files. According to an exemplary embodiment, a low frequency encryption analysis and a high frequency encryption analysis of a plurality of received files is performed to determine if the one or more of the files are encrypted. If a file is encrypted, a watcher is utilized to monitor file events associated with the files for determining if one or more of the files are infected with ransomware.

BRIEF DESCRIPTION

In some nonlimiting illustrative embodiments disclosed herein, a non-transitory storage medium stores instructions readable and executable by an electronic processor to perform a ransomware attack (RWA) detection method comprising: receiving incremental or differential backup metadata for a computer or network of computers via an electronic network, the incremental or differential backup metadata identifying files of the computer or network of computers which are new, modified, or deleted since a last incremental or last full backup of the computer or network of computers; extracting file metadata from the received incremental or differential backup metadata for the files which are new or deleted since the last incremental or last full backup of the computer or network of computers; identifying candidate new files and candidate deleted files in which the candidate new files are candidates for being encrypted copies of the candidate deleted files, the candidate new files and the candidate deleted files being identified using the extracted file metadata; and generating a RWA alert if the identified candidate new files and the candidate deleted files meet a RWA alert criterion computed using the extracted file metadata.

In some nonlimiting illustrative embodiments disclosed herein, a RWA detection method is performed by a backup system that includes an electronic processor. The RWA detection method comprises: receiving incremental or differential backup metadata for a computer or network of computers via an electronic network, the incremental or differential backup metadata identifying files of the computer or network of computers which are new, modified, or deleted since a last incremental or last full backup of the computer or network of computers; via the electronic network, receiving file content including (i) copies of the files identified in the incremental or differential backup metadata as new since the last incremental or last full backup of the computer or network of computers and (ii) at least a delta of changes for the files identified in the incremental or differential backup metadata as modified since the last incremental or last full backup of the computer or network of computers; extracting file metadata from the received incremental or differential backup metadata for the files which are new or deleted since the last incremental or last full backup of the computer or network of computers; identifying candidate new files and candidate deleted files in which the candidate new files are candidates for being encrypted copies of the candidate deleted files, the candidate new and candidate deleted files being identified using the extracted file metadata and not using the received file content; and performing RWA remediation including at least disabling the computer or network of computers via the electronic network. The RWA remediation is performed in response to one of: (i) the identified candidate new and candidate deleted files meeting a RWA alert criterion, or (ii) the identified candidate new and candidate deleted files meeting the RWA alert criterion and a RWA verification subsequently performed on the received file content of at least a sample of the candidate new files.

In some nonlimiting illustrative embodiments disclosed herein, a backup system comprises an electronic processor operatively connected with a cloud data storage, and a non-transitory storage medium storing backup instructions and RWA detection instructions. The backup instructions are readable and executable by the electronic processor to perform an incremental or differential backup of a system of folders or directories of a computer or network of computers via an electronic network. The RWA detection instructions are readable and executable by the electronic processor to perform RWA detection operations including: processing incremental or differential backup metadata acquired during the incremental or differential backup to determine whether a RWA alert is issued wherein the processing does not use the file content; and performing RWA remediation including at least disabling the computer or network of computers via the electronic network based at least in part on the RWA alert being issued.

BRIEF DESCRIPTION OF THE DRAWINGS

FIG. 3 shows an illustrative portion of file metadata of an incremental backup (i.e., delta) which is stored in an Extensible Markup Language (XML) format in this illustrative example, in a case in which there is no RWA occurring during the time of the incremental backup.

FIG. 4 shows an illustrative portion of file metadata of an incremental backup (i.e., delta) which is stored in an XML format in this illustrative example, in a case in which there is a RWA occurring during the time of the incremental backup.

DETAILED DESCRIPTION

Figure 1:
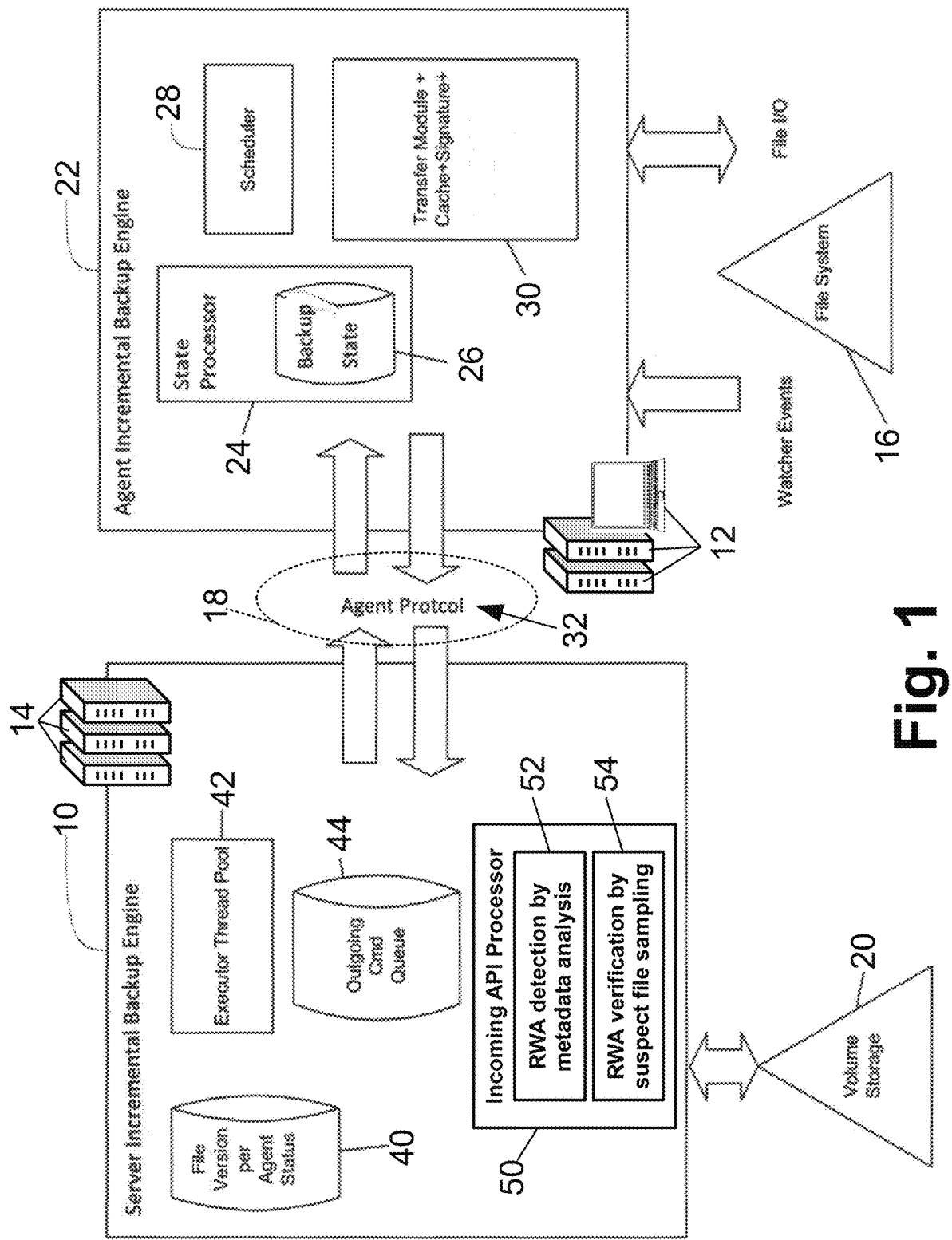
FIG. 1 diagrammatically illustrates an incremental or differential backup system for performing incremental or differential backup of a single computer, or a network of computers.

The following relates to ransomware attack (RWA) detection in the context of an incremental or differential backup system. In general, the incremental or differential backup system is implemented on an electronic processor, usually embodied as a server computer or plurality of server computers (e.g., a server cluster interconnected by an electronic network, or a cloud-based computing resource). The backup system provides backup services to a computer or network of computers via an electronic network, such as the Internet and/or one or more local area networks (LANs) and/or wide area networks (WANs). To begin the backup service, a full backup of the computer or network of computers is initially performed. This requires that the backup system receives a copy of every file of the computer or network of computers via the electronic network (or, at least, a copy of every file which is to be backed up by the backup service). The received files are stored on a cloud data storage, and this constitutes a full backup of the computer or network of computers. The full backup can take a substantial amount of time and network bandwidth as copies of every file to be backed up has to be transferred from the computer or network of computers to the backup system. However, such a full backup only needs to be performed once, or occasionally. After the initial full backup, incremental or differential backups are performed at chosen periodic or aperiodic time intervals. For example, an incremental or differential backup may be performed every hour, or once a day, or so forth.

A differential backup is a cumulative backup of all changes that have occurred since the last full backup. Hence, each successive differential backup includes all changes of the last differential backup, as well as any more recent changes. Over time, the successive differential backups require transfer of more and more file content as the changes since the last full backup accumulate over time. At some point, a new full backup is performed (e.g., preferably on a weekend, overnight, or at some other time when network usage is expected to be low), and subsequent differential backups are then relative to the last full backup.

An incremental backup is a backup of all changes that have occurred since the last backup. Hence, the first incremental backup is identical with the first differential backup, i.e., it includes all file content that has changed since the initial full backup. Thereafter, however, each successive incremental backup only transfers file content that has changed since the last incremental backup. Hence, unlike the case for differential backups for which the amount of file content transferred increases over time due to the cumulative nature of differential backups, the amount of file content transferred in successive incremental backups is not cumulative and hence does not (in general) grow over time since the last full backup. This generally allows for longer intervals between successive full backups in the case of an incremental backup system (in the limiting case, only the initial full backup is performed).

At the start of each incremental or differential backup iteration, incremental or differential backup metadata for the computer or network of computers is received at the backup system via the electronic network. Note, the term "update backup metadata" is also sometimes used herein as a generalization of incremental backup metadata or differential backup metadata). The incremental or differential backup metadata identifies files of the computer or network of computers which are new, modified, or deleted since a last incremental or last full backup of the computer or network of computers. The incremental or differential backup metadata includes at least file identifiers for all new, modified, or deleted files and the update status (new, modified, or deleted). An overwritten file is represented in the metadata as a deleted file followed in time by a new file, where both the deleted file and the new file have the same file identifier. In some file systems, if a file is overwritten, and not renamed, the update status would normally be 'modified'. If a file is renamed with a new filetype (i.e., a new fileextension) and modified (i.e., overwritten) it is represented by a 'deletefile' of the original file, and 'newfile' of the renamed file. The incremental or differential backup metadata usually includes additional information about the new, modified, or deleted files, such as file size at the time of the incremental or differential backup (or, in the case of deleted files, the file size at the time of file deletion), file system location information (e.g., in the case of a hierarchical file system, this may include the parent folder or directory or a full path from a root directory to the parent folder or directory), timestamp of file creation, deletion, or modification, and/or so forth.

In addition to the incremental or differential backup metadata, the actual file content must also be transferred from the computer or network of computers to the backup system via the electronic network. For each incremental or differential backup, the file content that is transferred includes: (i) copies of the files identified in the incremental or differential backup metadata as new since the last incremental or last full backup of the computer or network of computers and (ii) at least the changes for the files identified in the incremental or differential backup metadata as modified since the last incremental or last full backup of the computer or network of computers. Transferring only the changes for the modified files reduces the amount of transferred file content. Alternatively, however, the full content of the modified files may be transferred (which includes both the modified portions of the modified files, and the unmodified portions of the modified files).

Incremental or differential backup systems can safeguard against many data loss mechanisms. Typically, any lost data can be recovered except for any additions or changes made since the last incremental or differential backup. This allows for nearly full recovery of data lost by accidental file deletions, accidental file overwrites, hard drive crashes or other failure of data storage devices employed by the computer or network of computers, or so forth. An additional advantage is that if the incremental or differential backups are stored as separate units, recovery can be made to the time of any chosen incremental or differential backup. For example, if backups are performed on an hourly basis and it is desired to restore the computer or network of computers to the state they were in at a point in time three days ago then this can be done by restoring to the last full backup plus the differential backup made prior to the point in time three days ago; or, in the case of incremental backup, by restoring to the last full backup plus all successive incremental backups prior to the point in time three days ago.

One type of potential data loss that is less well defended by backup systems is a ransomware attack (RWA). In a RWA, malicious code is inserted into the computer or network of computers. The malicious code creates encrypted copies of files on the computer or network of computers and then deletes the original (i.e., unencrypted) files. Thereafter, the malicious code notifies the user or administrator of the computer or network of computers that the files are now encrypted, and demands payment of money (i.e., a "ransom"), usually in the form of a difficult-to-trace payment such as Bitcoin or another digital currency. The notification promises that upon receipt of the ransom payment, the user or administrator will receive a decryption key that will enable decryption and recovery of the encrypted files. If the encryption is sufficiently strong, it may be difficult or impossible for the user or administrator to decrypt the files without the decryption key; hence, even many large institutions (large corporations, city governments, and the like) pay the ransom. Even if the ransom is paid, however, there is no guarantee that the entity behind the RWA will actually provide the decryption key.

In principle, incremental or differential backup systems safeguard against RWAs. However, there are practical limitations. Many RWAs employ a long latency time between insertion of the malicious code and its activation to encrypt files and issue the notification to the user. The normal recovery procedure for file-based backup is to clean up the infected machine and restore the files from a backup-point before, and as close to the start of, the RWA encryption process as possible. Alternatively, the files can be restored to a completely new computer. Even if the original RWA executable happens to be part of that backup, it cannot necessarily reinstall and activate itself (at least immediately) due to the latency time employed by the RWA algorithm. In any case, after restoring the files from the backup, the restored machine should be scanned for viruses and malware using the latest anti-virus and ant-malware software in order to detect and remove the original RWA executable if it is present on the restored machine.

The foregoing relates to RWA protection; however, it does not provide RWA detection. The value of having RWA detection, as disclosed herein, includes but is not limited to: providing early warning; isolating the starting point of the RWA encryption process; and protecting the most recent backup by disconnecting the infected machine and/or aborting the current incremental or differential backup process. Early RWA detection can also be helpful to prevent the malware causing the RWA from spreading, tracking the spread if it has already begun; and/or taking other precautionary actions. Without RWA detection built into the backup system as disclosed herein, it can sometimes take days or weeks before a user discovers a machine has been attacked. Such a long time interval between RWA and discovery by the user can occur, for example, when the infected computer is an unattended network-based server, or a personal computer that is left on but unattended over a weekend or holiday break. In such cases with long discovery latency, restoring from a backup is complicated by factors such as identifying the backup point to use in the restoration and, for long discovery intervals, whether that backup point even still exists, as well as how to merge the content of the old backup with more recent data that has changed and that was not affected by the RWA.

To address this issue, it is disclosed herein to provide a RWA detection method operative in conjunction with an incremental or differential backup system. It should be noted that the RWA detection disclosed herein is different from, and combinable with, RWA protection. The latter (i.e., RWA protection) typically involves restoring an infected computer to a previous backup from a time before the RWA started, in combination with antivirus scanning of the restored computer to detect and remove the malware that instigated the RWA before it reactivates (i.e., during its latency period). RWA detection, on the other hand, provides an early warning of a potential RWA, so that the user or information technology (IT) administrator or managed service provider (MSP) can take remedial and precautionary actions to limit contamination of the most recent backup and spread of the malware.

With reference to FIG. 1, a backup system 10 provides backup service to a computer or network of computers 12. The backup system 10 comprises an electronic processor 14, for example a server computer or an illustrative plurality of server computers 14, optionally implemented as a cloud computing platform. It will be appreciated that the electronic processor may include multiple electronic processors, e.g., illustrative multiple server computers 14. The backup system 10 includes or is operatively connected with a non-transitory storage medium (e.g., local or network-based RAID array, cloud-based server storage, one or more hard disk drives, an optical disk, solid state drive, or so forth) that stores instructions readable and executable by the electronic processor 14 to perform the disclosed backup operations or methods and associated disclosed ransomware attack (RWA) detection operations or methods. For example, the stored instructions may include backup instructions readable and executable by the electronic processor 14 to perform an incremental or differential backup of a (typically although not necessarily hierarchical) system of folders or directories (i.e., file system) 16 of the computer or network of computers 12 via an electronic network 18, and RWA detection instructions readable and executable by the electronic processor to perform RWA detection operations.

The computer or network of computers 12 for which backup and RWA detection services is provided may be a single computer, e.g., a personal home computer in which the file system 16 is stored on an internal or external hard drive), or a network of computers, e.g., a corporate or other institutional computing network forming a corporate or institutional information technology (IT) system in which the file system 16 is maintained on one or more servers of the IT system and accessed by individual notebook or desktop computers or the like. The illustrative example is a network of computers 12 that includes both server computers and desktop and/or notebook computers.

While FIG. 1 illustrates a single network of computers 12 being serviced by the backup system 10, more typically the backup system 10 will provide backup service to a number of different "clients", that is, a number of different computers and/or networks of computers. To provide for this, the backup system 10 includes or is operatively connected with a high-volume data storage (i.e., volume storage) 20, for example a cloud-based data storage, which may be physically embodied as a RAID or other array or collection of magnetic and/or solid state drive (SSD) disks or the like. The volume storage 20 preferably employs storage redundancy and/or other techniques to ensure security of the backup(s) stored on the volume storage 20.

The electronic network 18 typically includes the Internet and local area networks (LANs) and/or wide area networks (WANs) or the like at the backup system 10 and at the serviced computer or network of computers 12. For example, the LAN or WAN at the serviced computer or network of computers 12 may be a local Internet Service Provider (ISP) network in the case of an individual home computer, or a corporate or institutional LAN or WAN in the case of the network of computers 12 being a corporate or institutional IT infrastructure. Typically, the backup system 10 will be provided as a commercial service or, for larger corporations or institutions, may be provided by the corporation or institution itself, in which cases the backup system 10 will be connected to a LAN or WAN of the commercial backup provider or corporation or other institution.

To provide connectivity with the backup system 10, the serviced computer or network of computers 12 runs an agent incremental an agent incremental or differential backup engine 22 including: a state processor 24 that maintains a backup state 26 indicating the files have been added, deleted or modified since the last incremental or last full backup; a scheduler 28 that schedules incremental or differential backups; and a transfer/cache/signatures module 30 that handles packaging and transferring the relevant information for an incremental or differential backup to the backup system 10. This relevant information includes incremental or differential backup metadata identifying files of the computer or network of computers 12 (that is, file of the file system 16) which are new, modified, or deleted since a last incremental or last full backup of the computer or network of computers, and the file content. The file content includes: (i) copies of the files identified in the incremental or differential backup metadata as new since the last incremental or last full backup of the computer or network of computers, and (ii) at least the changes for the files identified in the incremental or differential backup metadata as modified since the last incremental or last full backup of the computer or network of computers. Optionally, the second component (ii) may comprise full copies of the modified files. The agent incremental or differential backup engine 22 is suitably implemented as software stored on a non-transitory storage medium of, or operatively connected with, the serviced computer or network of computers 12 and read and executed by the serviced computer or network of computers 12 to implement the state processor 24, scheduler 28, and transfer/cache/signatures module 30. An agent protocol 32 synchronized with the backup system 10 is used for the transfer of the relevant information for an incremental or differential backup.

At the backup system (i.e., server incremental backup engine) 10, the backup information 40 is received and stored, including the incremental or differential backup metadata and the file content. The incremental or differential backup metadata is usually much smaller (in terms of file size or data quantity measured in bytes or other units) than the file content, and commonly the incremental or differential backup metadata is sent first followed by the file content. This allows the backup system 10 to begin performing some aspects of the incremental or differential backup concurrently as the file content is received over time. An executer thread pool 42 handles the incremental or differential backup process, preferably although not necessarily using parallel processing. The backup process performed by the executer thread pool 42 includes updating the file table of the backup stored at the volume storage 20 to reflect files indicated as deleted in the incremental or differential backup metadata, adding new files as they are received including indexing the new files in the file table of the backup in accordance with the incremental or differential backup metadata, and modifying or replacing files indicated as modified in the incremental or differential backup metadata with the modified files (or the changes to the modified files) as they are received. When files are encrypted by ransomware, the encrypted files are typically renamed with a new extension. The new extension can be randomly generated, for a particular RWA, or a fixed extension may be used that is typical for the strain of RWA (e.g., .devos, .phobos). This manifests in the backup as a delete of the original file, and adding of a new file. In general, the backup processing 42 can employ commercial and/or proprietary incremental or differential backup algorithms. Coordination of the backup process with the agent incremental backup engine 22 is via an outgoing command queue 44 of commands or data sent from the backup system 10 to the agent incremental backup engine 22 to coordinate operations of the two systems 10, 22.

The backup system further implements an incoming application programming interface (API) processor 50 that handles receipt of the incremental or differential backup metadata and the file content (as it comes in) and forwards this received backup information to the executer thread pool 42.

Additionally, the API processor 50 implements ransomware attack (RWA) detection 52, which analyzes the incremental or differential backup metadata to detect whether a RWA is ongoing at the serviced computer or network of computers 12. The approach employed leverages features recognized herein as indicative of a RWA, which can be extracted from the incremental or differential backup metadata without analyzing the file content of the new or modified files. For example, the disclosed approaches leverage the expectation that a RWA will likely result in pairs of new and deleted files in which, for each pair, the new file of the pair is an encrypted copy of the deleted file of the pair. Typically, the new file of the pair will be of about the same size as the deleted file of the pair, or slightly larger due to block-alignment and/or the adding of a file-header et cetera introduced by the RWA file encryption method. There may be other indicia of a RWA in the pairs of new and deleted files, such as one or more of: both the new and deleted files of a pair being in the same folder or directory; the deleted file being of a certain file type (e.g., document files, presentation files, or other files of the type commonly generated by users, as opposed to executable binary files or files containing interpreted programming language code which are less likely to be encrypted in a RWA; the filenames of the new and deleted files having some similarity (e.g., the encrypted file may have the same filename as the deleted file but with a different or added file extension, an added index number, or so forth); and/or so forth.

Hence, the RWA detection 52 searches the incremental or differential backup metadata to identify candidate new and candidate deleted files in which the candidate new files are candidates for being encrypted copies of the candidate deleted files, and generates a RWA alert if the identified candidate new and candidate deleted files meet a RWA alert criterion (optionally applied on a per-folder or per-directory level). In some embodiments, the candidate new and candidate deleted files are identified on a pairwise basis, in which the new file of the candidate pair is a candidate for being an encrypted copy of the deleted file of the candidate pair.

The term "candidate" as used in these contexts indicates that the identified candidate new file, identified candidate deleted file, or identified candidate pair of new and deleted files is identified as having characteristics indicative of the creation of the candidate new file and/or deletion of the candidate deleted file being a product of operation of a RWA algorithm. However, any given candidate new file, candidate deleted file, or candidate pair could alternatively have been produced by a benign operation such as a user intentionally encrypting a document and then overwriting the original document with the encrypted document, or a user compressing a file directory to produce a compressed zip file and then deleting the original unzipped directory, or so forth. While some candidate new files, deleted files, or pairs may be identified which are due to such benign operations, the RWA detection 52 is premised on the expectation that in any given incremental or differential backup the number of such benign candidates is expected to be low—hence, if there are a large number of candidate new and deleted files (or pairs of new and deleted files), especially in a single folder or directory, then this is a strong indication that the contents of the folder or directory may have been encrypted by a RWA algorithm. Optionally, an exclusion list of extensions used by commercially available encryption software, can be used to reduce or eliminate false-positives in these cases.

Advantageously, in some embodiments the identification of the candidate new and candidate deleted files is based on (i.e., uses) the incremental or differential backup metadata, and is not based on (i.e., does not use) the file content of the incremental or differential backup. By contrast, some existing RWA detection algorithms rely upon processing the file content to identify likely encryption (for example, based on entropy of the file content) and identifies a RWA if a sufficient number or fraction of encrypted files is identified (e.g., in a single folder or directory). Compared with RWA detection by file content analysis, the RWA detection 52 uses only the incremental or differential backup metadata, and not the file content. As a consequence, the RWA detection 52 is fast (as the incremental or differential backup metadata is much smaller than the file content in most cases) and can be performed as soon as the incremental or differential backup metadata is received at the backup system 10. Hence, the RWA detection 52 can be analyzing the incremental or differential backup metadata concurrently with the file content of the incremental or differential backup being transmitted from the agent 22.

If the RWA detection 52 generates a RWA alert, then in some embodiments RWA remediation is immediately performed in response to the RWA alert. The RWA remediation includes at least disabling the computer or network of computers 12 via the electronic network 18 in response to the RWA alert. To this end, the agent incremental backup engine 22 is programmed to receive a system disable command via the outgoing command queue 44 and, in response to the system disable command, causes cessation of operations of the computer or network of computers 12. The RWA remediation may include other actions, such as quarantining the computer, not starting update of the computer or network of computers 12 by disabling communication to or from the computer or network of computers 12 via the electronic network 18, and/or sending an email, text message, or other communication to the IT system administrator, homeowner, or other owner or custodian of the computer or network of computers 12, and/or not performing the most current incremental or differential backup (i.e., disabling processing by the executor thread pool 42 or preventing this processing from starting in the first place), and/or so forth.

In other embodiments, RWA remediation is not immediately performed in response to the RWA alert. Rather, in these embodiments the RWA alert triggers RWA verification by suspect file sampling 54, in which RWA alert verification is performed in response to the RWA alert. The RWA verification uses the received file content, and for example may perform entropy-based analysis of candidate new files (or of a sample of the candidate new files) to determine whether the candidate new files are actually encrypted. If most of these candidate new files are encrypted (e.g., more than a predefined threshold number or fraction of the candidate new files are encrypted), then this is verification of the RWA alert, since most of the candidate new files being encrypted is further evidence that they were created by a RWA. In some embodiments, the RWA verification also assesses the strength of encryption, as a RWA algorithm typically employs strong encryption. In these embodiments, the RWA remediation is performed in response to the RWA verification 54 satisfying a RWA alert verification criterion, such as the fraction of sampled candidate new files being encrypted (as indicated by the entropy analysis) exceeding a verification threshold. This approach of RWA verification 54 reduces false positives, that is, reduces incidents in which the RWA remediation is initiated even though there is no actual RWA occurring. As an incorrectly initiated RWA remediation can be costly in terms of downtime of the affected computer or network of computers 12, it is expected to be beneficial to perform the verification 54.

Figure 2:
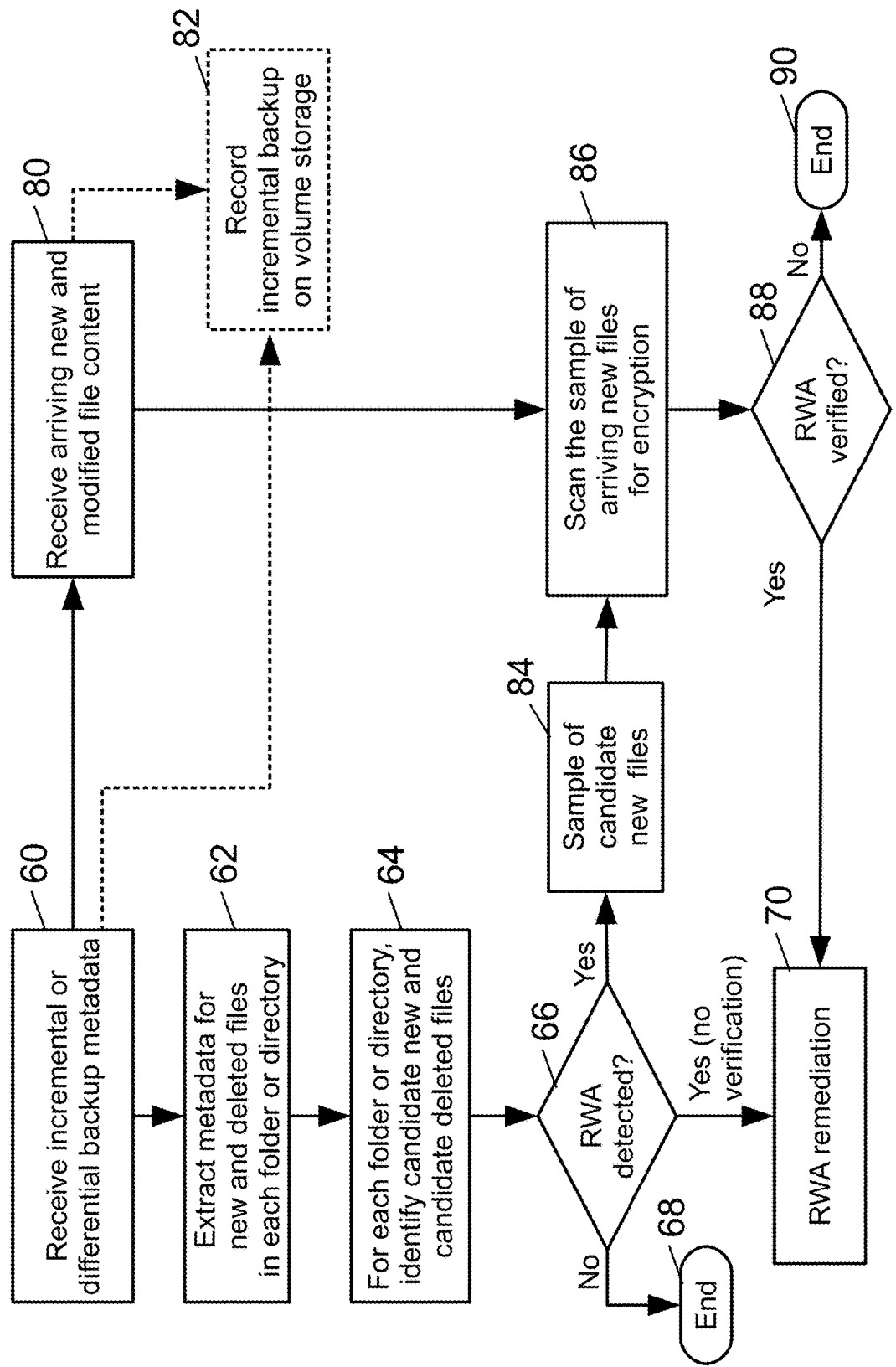
FIG. 2 diagrammatically illustrates a suitable embodiment of the RWA detection and RWA alert verification components of the incremental or differential backup system of FIG. 1.

With reference now to FIG. 2, an illustrative embodiment is described of a suitable embodiment of operation of the RWA detection 52 and RWA alert verification 54 components of the incremental or differential backup system of FIG. 1. In an operation 60, the incremental or differential backup process begins by receiving incremental or differential backup metadata from the serviced computer or network of computers 12 via the electronic network 18. The incremental or differential backup metadata can be in various forms, such as being an extensible markup language (XML) file (as in the illustrative embodiments), a proprietary binary file, or so forth. FIGS. 3 and 4 illustrate examples of a portion of an incremental or differential backup metadata in XML format in a case of normal backup activity (FIG. 3, i.e., no RWA underway) and in a case in which a RWA is underway (FIG. 4). In these examples, the metadata for each file includes: the filename; the file size (after creation or modification in the case of new or modified files, or prior to deletion in the case of deleted files); file status or "op" (new, delete, or update, in the examples of FIGS. 3 and 4, the latter also referred to herein as modified); a timestamp of the creation date (for new files), deletion date (for deleted files), or modification date (for updated or modified files); and information as to the parent folder or directory. The latter parent folder or directory metadata is captured by the hierarchical structure of the XML file used to represent the metadata—for example, in FIG. 3 the file named "Today.pdf" is contained in the folder named "Offsite June"; while, the file named "misc.docx" is contained in the folder named "Certificats". A given embodiment or implementation may include more, less, or different metadata than that shown in the examples of FIGS. 3 and 4; however, the file metadata generally includes at least a filename or other file identifier, a file status (of particular interest for the RWA detection, indicating new files and deleted files), the creation, modification, or deletion timestamp, and the file size.

In illustrative embodiments herein, the file system 16 of the serviced computer or network of computers is a hierarchical file system, in which files are stored in (or associated to) folders or directories, and folders or directories in turn can be stored in (or associated to) higher-level folders or directories, with the resulting tree-like structure usually terminating at a root folder or directory. However, the disclosed RWA detection is not limited to hierarchical file systems and could also be applied to file systems in which files are grouped in other ways. The terms "folder" and "directory" are used herein as these are common names for groupings of files in many existing file systems, but these terms as used herein are to be understood as encompassing otherwise-named groupings of files in a hierarchical or non-hierarchical file system.

In an operation 62, metadata are extracted for each new file and each deleted file identified in the incremental or differential backup metadata received at operation 60. In an operation 64, for each folder or directory, candidate new and candidate deleted files are identified, in which the candidate new files are candidates for being encrypted copies of the candidate deleted files. In some embodiments, candidate pairs of new and deleted files are identified, in which the new file of each pair is a candidate for being an encrypted copy of the deleted file of the pair. Comparison of FIGS. 3 and 4 illustrates why this information is probative of whether a RWA is underway. FIG. 3 shows a portion of incremental or differential backup metadata in XML format in a case of normal backup activity; whereas, FIG. 4 shows a portion of incremental or differential backup metadata in XML format in a case in which a RWA is underway. As seen in the normal backup pattern of FIG. 3, there is no apparent pairing of new and deleted files. By contrast, as seen in the RWA backup pattern of FIG. 4, there is a strong pattern of pairing of new and deleted files. Examples of such pairs are indicated by double-headed double-angled arrows. This pattern is indicative of a RWA, because the RWA usually operates by encrypting a file (thereby creating a new file) and then deleting the original file (this is then the deleted file), where the encrypted file will typically have a different name and or filename extension, as compared to the original file. Both operations are usually performed in a RWA, because the original files must be deleted to effectively "steal" the files, while the encrypted file is needed to later restore the files if the ransom is paid. (Even if the perpetrator has no intention of restoring the files upon payment of the ransom, which is sometimes the case, creation of encrypted files is usually done to provide the false hope that the files could be restored).

In some embodiments, the candidate new and candidate deleted files of a folder or directory are identified without specifically pairing up new and deleted files. For example, the identification can be based on counts of new, deleted, and modified files in the folder or directory. In the case of a folder or directory whose files have been encrypted by a RWA algorithm, it is expected that the count of new files should be equal to, or slightly larger than, the count of deleted files. This is because there will be one encrypted file for each deleted file. The number of new files in a file or directory introduced by the RWA may be slightly larger than the number of deleted files, for example due to the RWA algorithm generating an unencrypted ransom note file. It is also possible that a user may have benignly created a new file in the folder or directory in the interim between when the RWA algorithm encrypts the content of that folder or directory and the time of the incremental or differential backup. The number of ransom notes will usually be at most one per folder. The number of benignly created files is expected to be low, especially if the incremental or differential backups are being performed frequently, e.g., on an hourly basis for example. The affect of these benignly created files can be accounted for by allowing for a slight difference (e.g., one or two) between the counts of new and deleted files. Alternatively, the folder may be skipped, since it is likely that the ransomware infected multiple folders, and it is unlikely that a user modified files in all of them.

Likewise, the number of modified files in a folder or directory whose files have been encrypted by a RWA algorithm is expected to be zero or very low. A benign modified file would likely only arise if a user moves a file into the folder or directory and then modifies it, or modifies a file from another directory and then saves it to the folder or directory after the RWA algorithm has processed that folder or directory.

A further indicia of RWA algorithm processing of a folder or directory is that the sum of the file sizes of the new files should be equal to or slightly larger than the sum of the file sizes of the deleted files. This is because the encryption does not alter the file size much, so the file sizes should be comparable. The encrypted file may be slightly larger than the corresponding deleted file, due to factors such as block/sector-alignment and/or the adding of a file-header/trailer, with information used by the Ransomware.

In other embodiments, the candidate new and candidate deleted files are identified as candidate pairs of new and deleted files, in which the new file of each pair is a candidate for being an encrypted copy of the deleted file of the pair. Such pairwise identification of candidate new and deleted files can be based on various characteristics indicative of a possible RWA. For example, the identifying of candidate pairs of new and deleted files can be based at least in part on a deletion timestamp of the deleted file of a candidate pair being later in time than a creation timestamp of the new file of the candidate pair. This characteristic for identifying candidate pairs is premised on the expectation that the encrypted (i.e., new) file must be first created using data of the unencrypted file before the unencrypted file is then deleted. Hence, it is unlikely that the original file would be deleted before the corresponding encrypted file is created.

In another example, the identifying of candidate pairs of new and deleted files can be based at least in part on similarity of file sizes of the new and deleted files of the candidate pairs, with greater similarity being more strongly indicative of a pair possibly created by a RWA. The size similarity can be variously measured, for example by a ratio $R = F_{added}/F_{deleted}$ (where $F_{added}$ is the size of the added file and $F_{deleted}$ is the size of the deleted file) being in a range $(1-\Delta^-) < R < (1+\Delta^+)$ where $\Delta^-$ and $\Delta^+$ are tunable parameters of the RWA detection 50. Smaller values for $\Delta^-$ and $\Delta^+$ in this example require closer file size similarity to be identified as a candidate pair. It should be noted that $\Delta^-$ and $\Delta^+$ do not necessarily have the same value. This characteristic for identifying candidate pairs is premised on the expectation that the encrypted (i.e., new) file will be of about the same size as the original file.

In another example, the identifying of candidate pairs of new and deleted files can be based at least in part on the new file of a candidate pair being larger than the deleted file of the candidate pair. The increase in file size is expected to be small; hence, this criterion can be used in combination with the previous criterion, for example by recasting the file size similarity criterion as $1<R<(1+\Delta^+)$. In this formulation, the left portion ($1<R$) requires file size $F_{added}$ is larger than file size $F_{deleted}$.

In another example, the identifying of candidate pairs of new and deleted files can be based at least in part on a comparison of a file name of the new file of a candidate pair and a file name of the deleted file of the candidate pair. This characteristic for identifying candidate pairs is premised on the expectation that if the perpetrator of the RWA is actually intending to provide for restoration of the encrypted files upon payment of the demanded ransom (which, again, is in no way guaranteed), then it is necessary to have a way to recover the file name of the original file. The easiest way to do this is to embed the original file name into the name of the corresponding encrypted file in some way. In the illustrative example of FIG. 4, this is done by keeping the same file name and simply appending the file extension ".axx", but other approaches could be used. Hence, the comparison of the file name of the new file and the deleted file can use approaches such as identifying the file name of the deleted file as a substring of the file name of the new file, or using an edit distance to quantify similarity of the file names. In another approach, if candidate files have been found, and if the file extensions of deleted file is different to the file extension of the paired new file, then this is evidence strengthening likelihood of a RWA. Further strengthening a positive detection, is when all (or almost all) candidate new files have the same extension, as is also shown in the xml (.axx). This is a typical RWA pattern. If a common file extension is detected for the candidate new files, this file-extension can be used to pin-point the exact time when the RWA started, by then searching the metadata in the incremental or differential backup for the first file-occurrence of a new file with that extension, and based on the create timestamp.

In another example, the identifying of candidate pairs of new and deleted files can be based at least in part on the new and deleted files of a candidate pair being in a same directory or folder of the hierarchical system of folders or directories 16 of the computer or network of computers 12. Again, this is a common feature of a RWA as it simplifies restoration (or promised restoration) of the files insofar as the restoration simply entails adding a new decrypted file in place of the encrypted file. In some embodiments, this feature for identifying candidate pairs is implemented by performing the identification of candidate pairs on a per-folder or per-directory basis, that is, new files and deleted files are compared only within a given directory to identify the candidate pairs of new and deleted files.

The foregoing are some nonlimiting illustrative examples of possible characteristics that can be used in various specific implementations for identifying candidate pairs. A given embodiment may employ only a subset of these characteristics for identifying candidate pairs. Additionally or alternatively, a given embodiment may employ other characteristics for identifying the candidate pairs. For example, the RWA detection 52 may be updated as new RWA algorithms are identified. Once a particular RWA algorithm has been identified, specific characteristics of the new and deleted files created by that specific RWA algorithm can be used to more precisely identify candidate pairs. For example, if the RWA algorithm in operation in the example of FIG. 4 always creates the encrypted files with the file extension ".axx", then this characteristic can be used for identifying candidate pairs of new and deleted files in which the encrypted file with extension ".axx" is a stronger candidate for being an encrypted copy generated by that particular RWA algorithm. In this regard, the operation 64 can optionally include multiple parallel identification algorithms, one for each known RWA algorithm, and also an additional parallel identification algorithm using characteristics such as those described above to detect currently unknown RWA algorithms.

With continuing reference to FIG. 2, at a decision operation 66, it is determined whether a RWA is likely to be in progress on the serviced computer or computer network 12. The decision 66 is made on the basis of whether the candidate new and candidate deleted files identified in the operation 64 satisfy a RWA alert criterion. In some embodiments, the RWA alert criterion is applied on a per-folder or per-directory basis. By way of non-limiting illustrative example, the RWA alert criterion may, for example, include one of or a combination of the following: counts of the candidate new and candidate deleted files being similar; and/or a similarity of a sum of file sizes of the new files of the candidate pairs in the folder or directory and a sum of file sizes of the deleted files of the candidate pairs in the folder or directory, e.g., using the formula $(1-\Delta^-)<R_{sum}<(1+\Delta^+)$ where $\Delta^-$ and $\Delta^+$ are tunable parameters of the RWA detection 50 and $R_{sum}$=sum(file sizes of added files)/sum(file sizes of deleted files. In embodiments in which the candidate new and deleted files are identified in pairwise fashion, the decision 66 may be based on factors such as how many pairs are found in a given folder or directory, and based on an aggregation over the pairs of values of a file size similarity metric applied in pairwise fashion to the new and deleted files of the pairs.

If the decision 66 is that the RWA alert criterion is not met, then the instance of the RWA detection 52 is terminated at 68. On the other hand, if at decision 66 it is found that the RWA criterion is met, then in some embodiments the RWA alert immediately triggers RWA remediation 70 including at least disabling the computer or network of computers via the electronic network in response to the RWA verification satisfying a RWA alert verification criterion. Preferably, the RWA remediation may include other measures such as notifying the owner or administrator of the serviced computer or network of computers 12 of the suspected RWA, initiating an automated analysis of the incremental or differential backup content in an effort to identify the specific RWA algorithm, and/or so forth.

If the initiation of the RWA remediation 70 immediately upon issuance of a RWA alert at decision 66 is deemed likely to produce too many false positives (that is, too many instances in which RWA remediation is performed when in fact there was no RWA underway), then the RWA alert can instead be used to trigger the RWA verification 54 (see FIG. 1). FIG. 2 further depicts an embodiment of an illustrative execution of the RWA verification 54. As previously noted, the incremental or differential backup metadata is usually much smaller in size than the file content of the incremental or differential backup metadata (where, again, the file content of the incremental or differential backup includes the new files and either the modified files, or the changes to the modified files). Consequently, as diagrammatically shown in FIG. 2, the incremental or differential backup metadata is usually received first at the operation 60, and thereafter the new or modified file content is received in an operation 80 which is ongoing due to the large amount of file content usually involved. The file content received at operation 80 is recorded on the volume storage 20 in accord with the incremental or differential backup metadata in backup operation 82 (indicated in FIG. 2 by dashed lines to distinguish from the RWA detection and verification operations which are shown in solid lines in FIG. 2). The RWA verification 54 leverages this file content to verify the RWA alert issued by the decision 66. To this end, at an operation 84 a sample (or optionally all) of the candidate new files that triggered the RWA decision 66 to issue the alert are identified for verification. At an operation 86, the sample of arriving candidate new files are scanned for evidence of being encrypted files generated by an ongoing RWA. In one approach, an entropy of the candidate new files is computed, and if the computed entropy satisfies a criterion then the new files are identified as being generated by a RWA. As used herein, "entropy" refers to any measure or indication of randomness or information density, and references to the "entropy" of one or more files refers to any measure or indication of the randomness or information density of all or part of the one or more files' contents. Entropy can be measured or indicated using various types of metrics or tests, including, but not limited to, Shannon Entropy, Monte Carlo pi approximations, Chi-Squared tests, or by computing one or more mean byte values. If the measured entropy indicates a high degree of randomness in the contents of the file (or collection of files), this can be an indication that the file(s) have been infected with ransomware. Some illustrative embodiments of this entropy-based approach are disclosed in U.S. Ser. No. 16/431,188 filed Jun. 4, 2019 and titled "METHODS AND SYSTEMS FOR DETECTING A RANSOMWARE ATTACK USING ENTROPY ANALYSIS AND FILE UPDATE PATTERNS", first named inventor Kurt Hansen, which is incorporated by reference herein in its entirety. This is merely a non-limiting illustrative example, and more generally any type of RWA detection analysis of the file content of the candidate new files may be employed.

At an operation 88, if the RWA verification performed at operation 86 does not satisfy a RWA alert verification criterion then at an operation 90 the RWA verification ends and no remediation is performed. On the other hand, if the operation 90 determines that the RWA verification performed at operation 86 does satisfy the RWA alert verification criterion, then the RWA remediation 70 is performed. The RWA alert verification criterion can, for example, be the fraction of sampled candidate new files being encrypted (as indicated by the entropy analysis) exceeding a verification threshold (where the verification threshold is a tunable parameter of the RWA verification 54).

Notably, some preferred embodiments the RWA detection 52 (corresponding to operations 62, 64, 66 of FIG. 2) use the incremental or differential backup metadata but do not use the file content received at operation 80. This allows the RWA detection 52 to be performed quickly and while the file content receipt operation 80 is ongoing. By contrast, the RWA verification 54 (corresponding to operations 84, 86, 88 of FIG. 2) does operate on the file content—but, in some embodiments, only on the file content of a sample or all of the candidate new files are processed by the RWA verification 54, again making this more efficient than an alternative approach in which the file content of every new file received at operation 80 is analyzed.

Figure 5:
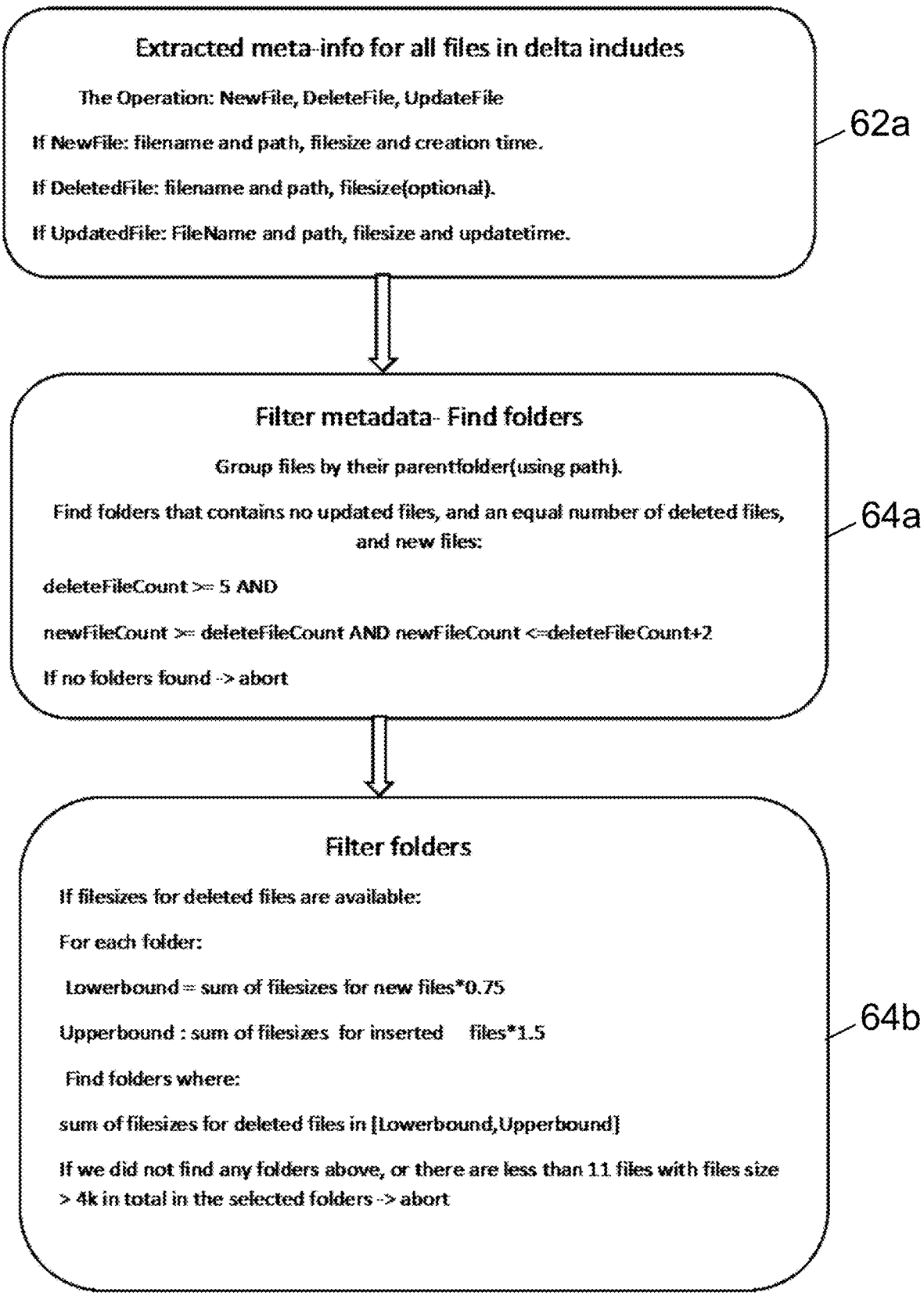
FIG. 5 diagrammatically illustrates a suitable embodiment of the metadata search operation for RWA detection in the illustrative embodiment of FIG. 2.

With reference now to FIG. 5, a more specific embodiment of operations 62, 64 of FIG. 2 is described as operations 62a, 64a, 64b. In this example, the identification of candidate new and candidate deleted files is done on a per-folder basis. In a more specific operation 62a shown in FIG. 5, the incremental or differential backup metadata is received and metadata for the added, deleted, and modified files is extracted. In the example of operation 62a, the extracted metadata for new files is filename, file path (providing the parent folder), file size, and file creation timestamp. The extracted metadata for deleted files is filename, file path, and optionally file size, and optionally file deletion timestamp.

In an operation 64a, the metadata generated at operation 62a is filtered to find folders. Files are grouped by their parent folder using the file path metadata. Folders are located that contain an equal (or near equal) number of deleted files and new files. In the illustrative example of FIG. 5, the following criterion is used to identify a folder that may be affected by a RWA. The folder must have:

deleteFileCount>=5 AND newFileCount>=deleteFileCount AND
    newFileCount<=deleteFileCount+2

The rationale for the last constraint is that some RWA algorithms add a ransom note in each folder. Additionally, the incremental backup could start in the middle of an encryption operation, so that the new file operation is recorded, but the delete operation is not. The factor of "+2" rather than "+1" allows for that case. This situation is more likely to arise in systems in which incremental or differential backups are performed more frequently, e.g., as frequently as on the order of every 30 seconds in some systems. More generally, the fixed scalar "+2" could be made a tunable parameter of the RWA detection 52. In the example of FIG. 5, the operation 62a also limits the identified folders to those that contain no modified (i.e., updated) files. This is premised on the assumption that the RWA encryption is likely to be the last operation performed in any given folder, since once the files are encrypted any attempt by a user to open a file in a word processor or other application program will fail because the target file will have been deleted by the RWA. Alternatively, this requirement could be eliminated or relaxed, e.g., using a constraint of:

modifiedFileCount<=N where N is a tunable parameter of the RWA detection 52. This would allow, for example, for a situation in which the user creates and then modifies one, or a few (i.e., up to N) files after the RWA encrypts the files of the folder.

In an operation 64b, the folders identified in operation 64a are analyzed to assess the similarity of the sum of file sizes of the candidate new files and the sum of file sizes of the candidate deleted files. In this example, the following algorithm is applied to each folder identified in operation 64a:

Lowerbound=sum of filesizes for new files×0.75

Upperbound=sum of filesizes for new files×1.5

Find folders meeting filesize similarity criterion:
    Sum of filesizes for deleted files is in [Lowerbound, Upperbound]
If no folders satisfy the filesize similarity criterion, or there are less than 11 files with file size >4 kilobytes in total in the selected folders, then the RWA alert is not issued.

A further illustrative embodiment is described below.

In this embodiment, in the operation 62, the metadata for the new, modified, and deleted files is organized into a list. Folders are ignored (only files are processed to detect the RWA, albeit using the folder hierarchy to perform the file analysis on a per-folder basis in some embodiments). Content from folders that was created/deleted since the last backup is also ignored. A unique identifier is created for each parent folder, that has files in the list (using the filepath metadata if available), in such a way that when list is ordered by this identifier metadata belonging to files from the same folder, are listed next to each other.

In the operation 64, the ordered list is scanned sequentially to identify each folder, and the file-operations (i.e., new, deleted, and modified files) that belong to that folder. The scanning looks for folders with certain characteristics, as described below.

When a RWA executes on the computer or network of computers 12, it typically will find target files one at a time, it will create a new encrypted file first, then delete the original file (or overwrite the original file, then rename it, —but that will look like an insert and delete in Microsoft Windows and most other file systems, if the file extension is changed). In this RWA process, new files and deleted files are always paired in a folder or directory. If the computer or network of computers 12 is backed up once every hour for example, this pattern will be very consistent in the case of an actual RWA. At the time the backup-snapshot is taken for an incremental or differential backup, there is a small chance that an insert may be registered, but the subsequent delete is not (yet) registered and will only show up in the next incremental backup, in which case there will be one additional insert. But this is expected to be a small effect.

If furthermore the RWA adds a ransom note in each folder, the count of new files in a folder may be higher (e.g., by +1 or +2) compared to the count of deleted files in the folder. That is, the count of new files is expected to be in the range [deleted-file_count, deleted_file_count+2], in such a RWA. This condition may not work well for folders with very few files. To address this, an optional minimum condition is applied as follows: deleted_file_count>5. That is, if the number of deleted files in a folder or directory is less than or equal to 5, then that folder or directory is skipped. More generally, the value 5 used here can be a tunable parameter of the RWA detection 52.

It can happen that an incremental or differential backup includes both benign changes made by a user, and changes made by the RWA algorithm. But even in such cases, the changes made by the RWA algorithm will normally be vastly dominant, if it has executed for a little while. Optionally, this can be addressed by placing a limit on the number of permissible modified files in a folder or directory.

When a file is being encrypted by a RWA algorithm (or, for that matter, by any encryption operation), the size of the resulting encrypted file tends to be almost the same as the original file, most commonly slightly larger than the original file due to some padding, and buffer boundaries or so forth. If the file sizes of the deleted files in a folder is available in the incremental or differential backup metadata (as, for example, in the XML metadata examples of FIGS. 3 and 4), they can be matched with the sizes of the new files, in the same folder. The file size information can thus be leveraged to further narrow down the possibility of a RWA. This also advantageously removes the case where a user uses a file-compression utility on individual files, because in that case the new files would be much smaller than the deleted files. An example of this is shown in operation 64b of FIG. 5 which was previously described herein. Optionally, the file sizes can be used (alone or in combination with other information) to identify candidate pairs of new and deleted files, in which the new file of the candidate pair is a candidate to be an encrypted copy of the deleted file of the candidate pair. To pair the deleted files with the new files, the files in a folder or directory can be sorted by file size, with the expectation that paired new and deleted files will occur next to each other in the list sorted by file size.

Encryption of small files (e.g., less than 4 kilobytes or so) may not result in the discussed characteristics being predominant. Hence, in some embodiments files that are smaller than some threshold (e.g., 4 Kb) are ignored.

If no folders are identified which satisfy the foregoing characteristics (e.g., as described with reference to FIG. 5 operations 64a, 64b, or there are less than 11 files with files size >4 Kb in total in the selected folders, then the RWA detection 52 concludes that no RWA has been detected, and hence no RWA alert is issued. Otherwise, a RWA alert is issued.

Figure 6:
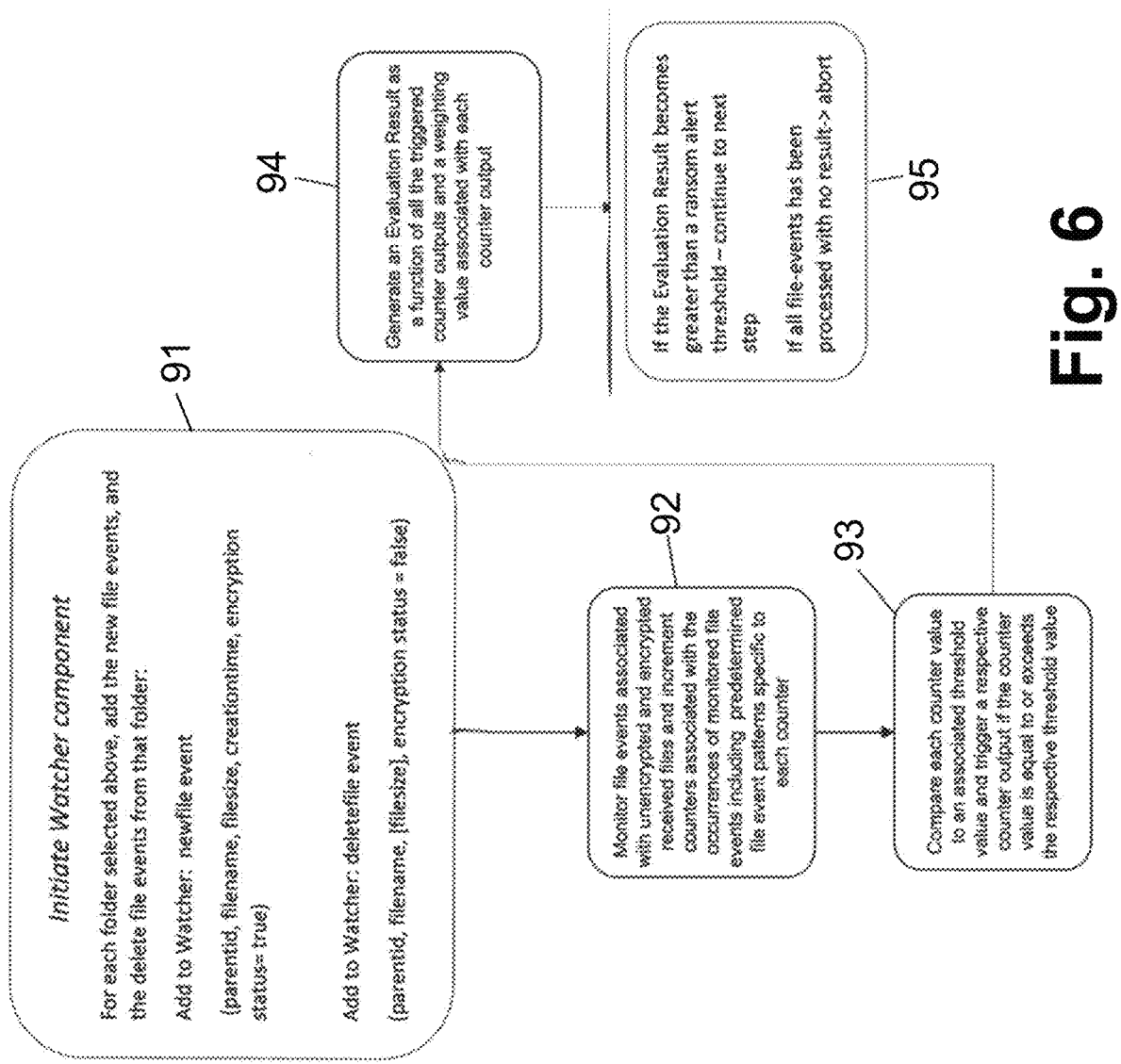
FIG. 6 diagrammatically illustrates an implementation of a second stage of the RWA detection based on metadata (decision 66 of FIG. 2) which employs a Watcher.

With reference now to FIG. 6, an illustrative extension of the RWA detection 66 of FIG. 2 is described. This extension is implemented as a Watcher which is initiated if any folders or directories processed in operation 64 are identified as suspicious, for example using the criteria applied by the operation 66 as previously described. When these criteria detect a possible RWA a monitoring program, referred to herein as a Watcher, is initiated in an operation 91 shown in FIG. 6. For each suspicious folder or directory, the new file events and the delete file events from that folder are added to the Watcher. At an operation 92, the Watcher monitors file events associated with unencrypted and encrypted sample files and increments counters associated with the occurrences of monitored file events including predetermined file event patterns specific to each counter. At an operation 93, the Watcher compares each counter value to an associated threshold value and triggers a respective counter output if the counter value is equal to or exceeds the respective threshold value. At an operation 94, the Watcher generates an Evaluation Result as a function of all the triggered counter outputs and a weighting value associated with each counter output. At an operation 95, Watcher generates a preliminary Ransom Alert if the Evaluation Result is greater than a ransom alert threshold value. An illustrative implementation of the Watcher of FIG. 6 is summarized as follows:

```
Initiate Watcher:
For each folder selected above, add the new file events,
and the delete the events from that folder:
Add to Watcher: newfile event
    (parentid,
    filename,
    filesize,
    timestamp of file,
    encryption state = true)
Add to Watcher: deletefile event
    (parentid,
    filename,
    [filesize],
    Encryption state = false)
Until done,
or Watcher aborts,
or Watcher creates Preliminary Ransomware Alert
```

Note that "encryption state=true" in the above formulation is tentative since it is based on the metadata analysis performed by the RWA detection by metadata analysis 52 of FIG. 1. Hence, the output of the Watcher of FIG. 6 is the final output of the RWA detection 66, and is only a preliminary Ransom Alert, which is then verified by a process shown in FIG. 7 which will be described shortly. The Preliminary Ransomware Alert output by the Watcher of FIG. 6 indicates that the update pattern present in the metadata of the incremental or differential backup matches that of a RWA. The Watcher of FIG. 6 also detects a common file extension of the new files (if such a common file extension exists, as typical for an RWA), that matches this pattern. The process of FIG. 7 then loops over files from the selected folders, having this file extension, and a size >4 Kb, and analyzes the file content (rather than the metadata as in the RWA detection 52 and the Watcher of FIG. 6) to verify the new files are actually encrypted. However, because the RWA detection by metadata analysis 52 (including, in the present embodiment, the Watcher of FIG. 6) operates before and/or during transfer of the files of the incremental or differential backup, and the Watcher of FIG. 6 may in turn trigger the RWA verification of FIG. 7 before the file content is available. Hence, each time a file of the suspicious folder or directory is received from the agent 22, it is checked as to whether it has the correct file extension, and size >4 Kb. In one approach, sample candidate new files are processed until a maximum of M files (where M=75 in one nonlimiting illustrated embodiment) are processed, and if this maximum of M files is reached without determining RWA verification then the process aborts. In another embodiment, the RWA verification is issued when count of encrypted files>=11 AND count of encrypted files>file count tested×0.75. These are nonlimiting examples.

Figure 7:
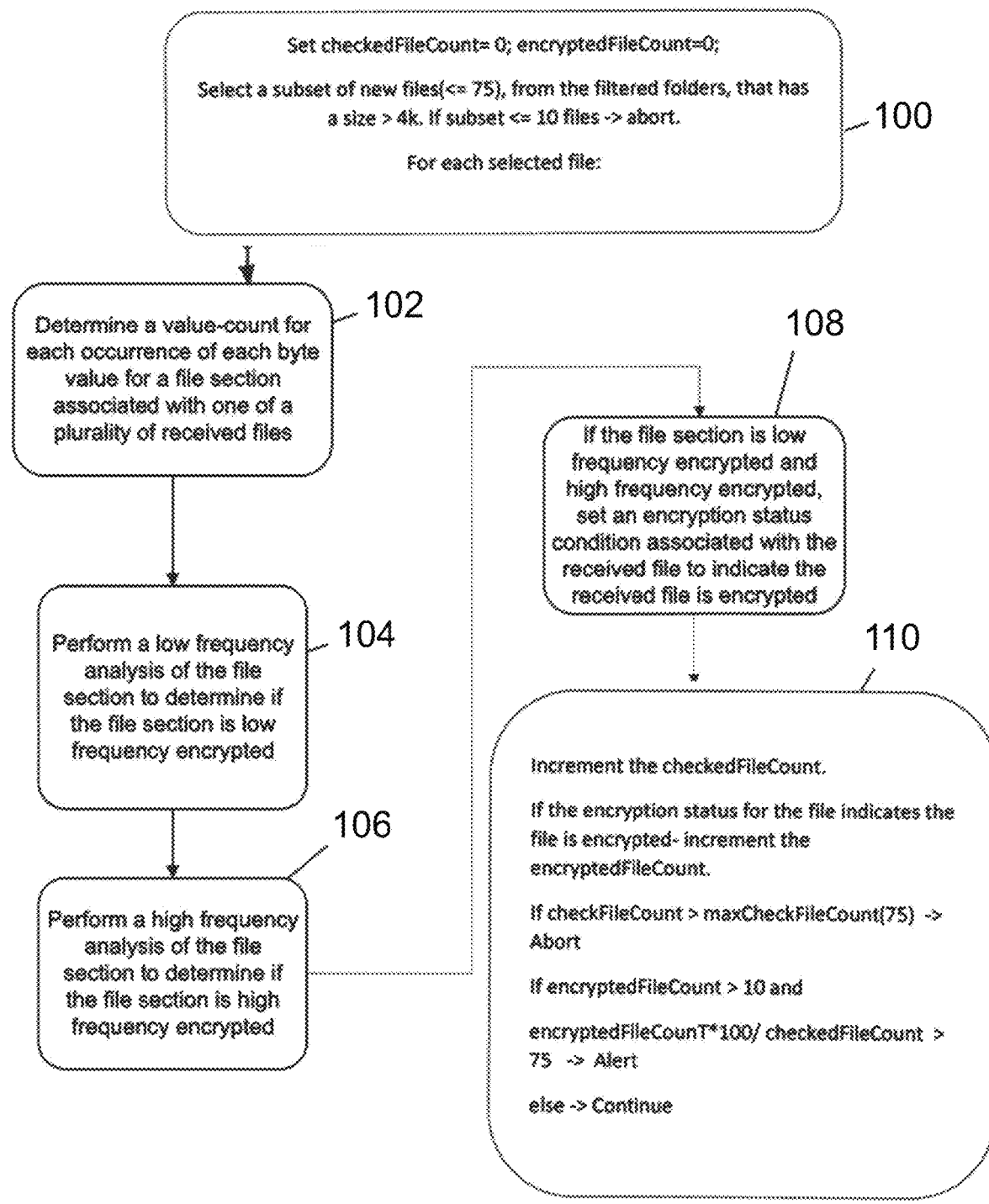
FIG. 7 diagrammatically illustrates an implementation of the RWA verification which employs entropy analysis with low and high frequency encryption analyses of file sections to determine file encryption status.

With reference now to FIG. 7, the illustrative RWA verification approach of FIG. 7 employs an entropy analysis comprising low frequency encryption analysis and high frequency encryption analysis of file sections to determine an encryption status of the file. See U.S. Ser. No. 16/431,188 filed Jun. 4, 2019, which is incorporated by reference herein in its entirety, for additional examples of RWA detection by analysis of the content of the files (as opposed to analysis of the metadata as is done in the RWA detection 52 of FIG. 1). In overview, the analysis of FIG. 7 is performed on portions of files, referred to herein as file sections. As described with reference to operation 84 of FIG. 2, the files analyzed are samples of the candidate new files that are candidates to be encrypted copies of files produced by a RWA, as identified in the RWA detection operation 52 of FIG. 1. For example, the sample files may be identified by the Watcher of FIG. 6. In an operation 100 shown in FIG. 7, counters used in the illustrative RWA verification 54 are initially zeroed. In an operation 102, a value-count is determined for each occurrence of each byte value for a file section associated with one of a plurality of sample files from operation 84 of FIG. 2. In one illustrative embodiment, the value-count includes substantially a total number of byte value occurrences included in the file section for each possible byte value. In an operation 104, a low frequency analysis of the file section is performed to determine if the file section is low frequency encrypted. At an operation 106, a high frequency analysis of the file section is performed to determine if the file section is high frequency encrypted. At an operation 108, if the file section is low frequency encrypted and high frequency encrypted, an encryption status condition associated with the sample file is set to indicate the received file is encrypted. At an operation 110, if the received file encryption status condition indicates the received file is encrypted, then a counter of encrypted sample files is incremented. The operations 102, 104, 106, 108, 110 are repeated for each sample file provided by the operation 84 of FIG. 2 (e.g., identified by the Watcher of FIG. 6), and if a RWA verification criterion is met then the RWA detection is verified (corresponding to operation 88 of FIG. 2).

One approach for the low frequency analysis of operation 102 is as follows. In general, the low frequency analysis determines substantially a total value-count of each, or substantially each, occurrence of each possible byte value for a file section associated with one of a plurality of received files. According to one illustrative embodiment, the value-count includes substantially a total number of byte value occurrences included in the file section for each possible byte value. Depending on the characteristics of the file section or other factors, one or more byte values included in the file section may be excluded from the value-count determination. Also, if a possible byte value is not represented/included in the file section, the corresponding byte value counter will be equal to 0 (zero probability) which contributes to the calculations. The low frequency analysis 102 calculates a low frequency entropy value associated with the file section, the low frequency entropy value calculated based on a total number, or substantially a total number, of byte value occurrences included in the file section for each of the possible byte values, where depending on the characteristics of the file section or other factors, one or more byte values included in the file section may be excluded. It is determined whether the calculated low frequency entropy value is greater than a low frequency entropy threshold value. If the calculated low frequency entropy value is greater than the low frequency entropy threshold value, then a flag low_freq_ent=true is set, else low_freq_ent=false. A low frequency average value of all or substantially all byte values included in the file section is calculated, and it is determined whether the calculated low frequency average value of all, or substantially all, byte values is within a low frequency average value range threshold. If the calculated low frequency low average value of all byte values is within the low frequency average value range threshold value, the method sets low_freq_ave=true, else low_freq_ave=false. If the calculated low frequency entropy value is not greater than the low frequency entropy threshold, and/or the calculated low frequency average value is not within the low frequency average value range, then the method proceeds back to perform a low frequency analysis of the next received file. On the other hand, if the calculated low frequency entropy value is greater than the low frequency entropy threshold, and the calculated low frequency average value is within the low frequency average value range, then the received file is determined to be low frequency encrypted. In some illustrative examples, the calculated overall entropy for the file in the range of 7.98-8.0 is taken as an indicator of low frequency encryption; however, a range of 7.92-8.0 or some other range can also be used. In some illustrative examples, the weighted average of all byte-values in a range around 127.5, e.g., 125-130, is taken as an indicator of low frequency encryption. These are merely illustrative examples.

One approach for the high frequency analysis of operation 106 is as follows. In general, the high frequency analysis determines substantially a total value-count of each, or substantially each, occurrence of each possible byte value for a file section associated with one of a plurality of received files. According to an exemplary embodiment, the value-count includes substantially a total number of byte value occurrences included in the file section for each possible byte value. Depending on the characteristics of the file section or other factors, one or more byte values included in the file section may be excluded from the value-count determination. Also, if a possible byte value is not represented/included in the file section, the corresponding byte value counter will be equal to 0 (zero probability) which contributes to the calculations provided below. In one approach, a high frequency average entropy value is calculated associated with a plurality of consecutive subsection entropy values calculated for a plurality of respective consecutive subsections of bytes included in the file section. A high frequency minimum entropy value is calculated associated with the plurality of consecutive subsection entropy values. A high frequency high-low probability ratio value is calculated associated with the file section. The high frequency high-low probability ratio is calculated by dividing a highest probability of a byte value by a lowest probability of a byte value included in the file section. It is to be understood that the highest probability of a byte value may include any high probability measure, such as but not limited to, one of a plurality of probability indicator values associated with a range of possible probabilities, e.g., very high, high, average, low, very low. It is determined whether the calculated high frequency entropy value is greater than a high frequency entropy threshold value, AND the calculated high frequency minimum entropy value is greater than a high frequency minimum entropy threshold value, AND the calculated high frequency high-low probability ratio is lower than a high frequency high-low probability threshold value. If this is the case, then the sample file is identified as a high frequency encrypted file.

In one suitable embodiment of the operation 110 of FIG. 7, the criterion for issuing an alert is as follows. A counter encryptedFileCount is maintained which keeps track of the number of sample files (from operation 84 of FIG. 2) that are identified as encrypted at the operation 108. A counter checkFileCount is maintained which keeps track of the number of the number of sample files (from operation 84 of FIG. 2) that are checked by applying operations 102, 104, 106, 108 to the sample files. Then the following criteria are applied:

--- if checkFileCount > maxCheckFileCount(75) then Abort;
if encryptedFileCount > 10 and
    encryptedFileCount × 100/checkedFileCount > 75 then Alert
else → continue processing sample files from operation 84.

---

Disclosed herein are exemplary embodiments including, but not limited to the following:

[A1] A non-transitory storage medium storing instructions readable and executable by an electronic processor to perform a ransomware attack (RWA) detection method comprising: receiving incremental or differential backup metadata for a computer or network of computers via an electronic network, the incremental or differential backup metadata identifying files of the computer or network of computers which are new, modified, or deleted since a last incremental or last full backup of the computer or network of computers; extracting file metadata from the received incremental or differential backup metadata for the files which are new or deleted since the last incremental or last full backup of the computer or network of computers; identifying candidate new files and candidate deleted files in which the candidate new files are candidates for being encrypted copies of the candidate deleted files, the candidate new files and the candidate deleted files being identified using the extracted file metadata; and generating a RWA alert if the identified candidate new files and the candidate deleted files meet a RWA alert criterion computed using the extracted file metadata.

[A2] The non-transitory storage medium of paragraph [A1] wherein the non-transitory storage medium further stores instructions readable and executable by the electronic processor to perform an incremental or differential backup method comprising: via the electronic network, receiving file content including (i) copies of the files identified in the incremental or differential backup metadata as new since the last incremental or last full backup of the computer or network of computers and (ii) at least changes for the files identified in the incremental or differential backup metadata as modified since the last incremental or last full backup of the computer or network of computers; and updating a backup of the computer or network of computers stored on a data storage with the received file content.

[A3] The non-transitory storage medium of paragraph [A2] wherein the identifying of the candidate new files and the candidate deleted files does not use the received file content.

[A4] The non-transitory storage medium of paragraph [A3] wherein the RWA detection method further comprises: performing a RWA alert verification in response to the RWA alert wherein the RWA verification uses the received file content; and performing RWA remediation including at least disabling the computer or network of computers via the electronic network in response to the RWA verification satisfying a RWA alert verification criterion.

[A5] The non-transitory storage medium of paragraph [A1] wherein the RWA detection method further comprises performing RWA remediation including at least disabling the computer or network of computers via the electronic network in response to the RWA alert.

[A6] The non-transitory storage medium of paragraph [A1] wherein the identifying of candidate new files and candidate deleted files comprises identifying candidate pairs of new and deleted files based at least in part on a deletion timestamp of the deleted file of a candidate pair being later in time than a creation timestamp of the new file of the candidate pair.

[A7] The non-transitory storage medium of paragraph [A1] wherein the identifying of candidate new files and candidate deleted files includes one of:
identifying candidate new and deleted files based at least in part on similarity of a sum of the file sizes of the new files and a sum of the file sizes of the deleted files; or identifying candidate pairs of new and deleted files based at least in part on similarity of a file size of the new file of a candidate pair and a file size of the deleted file of the candidate pair.

[A8] The non-transitory storage medium of paragraph [A7] wherein the identifying of candidate new files and candidate deleted files comprises identifying candidate pairs of new and deleted files based at least in part on the new file of a candidate pair being larger than the deleted file of the candidate pair.

[A9] The non-transitory storage medium of paragraph [A1] wherein the identifying of candidate new and candidate deleted files comprises identifying candidate pairs of new and deleted files based at least in part on a comparison of a file name of the new file of a candidate pair and a file name of the deleted file of the candidate pair.

[A10] The non-transitory storage medium of paragraph [A1] wherein the identifying of candidate new and candidate deleted files comprises identifying candidate pairs of new and deleted files based at least in part on the new and deleted files of a candidate pair being in a same directory or folder of a hierarchical system of folders or directories of the computer or network of computers.

[A11] The non-transitory storage medium of paragraph [A1] wherein the computer or network of computers employs a hierarchical system of folders or directories, and the identifying of candidate new and candidate deleted files is performed on a per-folder or per-directory basis.

[A12] The non-transitory storage medium of paragraph [A11] wherein the identifying of candidate new and candidate deleted files comprises identifying candidate pairs of new and deleted files in a folder or directory based on one or more of: a deletion timestamp of the deleted file of a candidate pair being later in time than a creation timestamp of the new file of the candidate pair; similarity of a file size of the new file of a candidate pair and a file size of the deleted file of the candidate pair; a file size of the new file of a candidate pair being larger than a file size of the deleted file of the candidate pair; and/or a comparison of a file name of the new file of the candidate pair and a file name of the deleted file of the candidate pair.

[A13] The non-transitory storage medium of paragraph [A11] wherein the RWA alert is generated if the identified candidate new and candidate deleted files in at least one folder or directory of the hierarchical system of folders or directories satisfies the RWA alert criterion.

[A14] The non-transitory storage medium of paragraph [A13] wherein the RWA alert is generated if the identified candidate new and candidate deleted files in a folder or directory satisfies a folder or directory RWA alert criterion computed using counts of the candidate new files and the candidate deleted files in the folder or directory.

[A15] The non-transitory storage medium of paragraph [A14] wherein: the extracting of the file metadata further includes extracting file metadata from the received incremental or differential backup metadata for the files which are modified since the last incremental or last full backup of the computer or network of computers; and the RWA alert criterion is further based on a count of the modified files in the folder or directory being less than or equal to a maximum modified files count threshold.

[A16] The non-transitory storage medium of paragraph [A15] wherein the maximum modified files count threshold is zero.

[A17] The non-transitory storage medium of paragraph [A15] wherein the folder or directory RWA alert criterion further includes at least: similarity of a sum of file sizes of the candidate new files in the folder or directory and a sum of file sizes of the candidate deleted files in the folder or directory.

[B1] A ransomware attack (RWA) detection method performed by a backup system including an electronic processor, the RWA detection method comprising: receiving incremental or differential backup metadata for a computer or network of computers via an electronic network, the incremental or differential backup metadata identifying files of the computer or network of computers which are new, modified, or deleted since a last incremental or last full backup of the computer or network of computers; via the electronic network, receiving file content including (i) copies of the files identified in the incremental or differential backup metadata as new since the last incremental or last full backup of the computer or network of computers and (ii) at least changes for the files identified in the incremental or differential backup metadata as modified since the last incremental or last full backup of the computer or network of computers; extracting file metadata from the received incremental or differential backup metadata for the files which are new or deleted since the last incremental or last full backup of the computer or network of computers; identifying candidate new files and candidate deleted files in which the candidate new files are candidates for being encrypted copies of the candidate deleted files, the candidate new and candidate deleted files being identified using the extracted file metadata and not using the received file content; and performing RWA remediation including at least disabling the computer or network of computers via the electronic network in response to one of: (i) the identified candidate new and candidate deleted files meeting a RWA alert criterion, or (ii) the identified candidate new and candidate deleted files meeting the RWA alert criterion and a RWA verification subsequently performed on the received file content of at least a sample of the candidate new files.

[B2] The RWA detection method of paragraph [B1] wherein: the computer or network of computers employs a hierarchical system of folders or directories; and the identifying of candidate new and candidate deleted files is performed on a per-folder or per-directory basis; and the RWA alert criterion is applied on a per-folder or per-directory basis.

[B3] The RWA detection method of paragraph [B2] wherein the RWA alert criterion applied to a folder or directory is based at least on: similarity of a count of the candidate new files in the folder or directory and a count of the candidate deleted files in the folder or directory; and similarity of a sum of file sizes of the candidate new files in the folder or directory and a sum of file sizes of the candidate deleted files in the folder or directory.

[B4] The RWA detection method of paragraph [B2] wherein the identifying of candidate new and candidate deleted files in a folder or directory includes identifying candidate pairs of new and deleted files in which the candidate new file of each pair is a candidate for being an encrypted copy of the candidate deleted file of the pair.

[B5] The RWA detection method of paragraph [B4] wherein the identifying of candidate pairs of new and deleted files is based on one or more of: a deletion timestamp of the deleted file of a candidate pair being later in time than a creation timestamp of the new file of the candidate pair; similarity of a file size of the new file of a candidate pair and a file size of the deleted file of the candidate pair; a file size of the new file of a candidate pair being larger than a file size of the deleted file of the candidate pair; and/or a comparison of a file name of the new file of the candidate pair and a file name of the deleted file of the candidate pair.

[C1] A backup system comprising: an electronic processor operatively connected with a cloud data storage; and a non-transitory storage medium storing: backup instructions readable and executable by the electronic processor to perform an incremental or differential backup of a system of folders or directories of a computer or network of computers via an electronic network; and ransomware attack (RWA) detection instructions readable and executable by the electronic processor to perform RWA detection operations including: processing incremental or differential backup metadata acquired during the incremental or differential backup to determine whether a RWA alert is issued wherein the processing does not use the file content; and performing RWA remediation including at least disabling the computer or network of computers via the electronic network based at least in part on the RWA alert being issued.

[C2] The backup system of paragraph [C1] wherein the processing of the incremental or differential backup metadata to determine whether a RWA alert is issued includes: processing the incremental or differential backup metadata to identify one or more folders or directories that contain candidate new files and candidate deleted files in which the candidate new files are candidates for being encrypted copies of the candidate deleted files, the candidate new and deleted files being identified without using file content; and issuing the RWA alert based at least in part on at least one folder or directory containing candidate new and candidate deleted files meeting a RWA alert criterion.

[C3] The backup system of paragraph [C1] wherein the RWA detection operations further include, in response to the RWA alert being issued: performing a RWA verification comprising encryption detection performed on file content of at least a sample of the candidate new files received during the incremental or differential backup; wherein the RWA remediation is performed further based on the RWA verification meeting a RWA verification criterion.

Some portions of the detailed description herein are presented in terms of algorithms and symbolic representations of operations on data bits performed by conventional computer components, including a central processing unit (CPU), memory storage devices for the CPU, and connected display devices. These algorithmic descriptions and representations are the means used by those skilled in the data processing arts to most effectively convey the substance of their work to others skilled in the art. An algorithm is generally perceived as a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be understood, however, that all of these and similar terms are to be associated with the appropriate physical quantities and are merely convenient labels applied to these quantities. Unless specifically stated otherwise, as apparent from the discussion herein, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The exemplary embodiment also relates to an apparatus for performing the operations discussed herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the methods described herein. The structure for a variety of these systems is apparent from the description above. In addition, the exemplary embodiment is not described with reference to any particular programming language. It will be appreciated that a variety of programming languages may be used to implement the teachings of the exemplary embodiment as described herein.

A machine-readable medium includes any mechanism for storing or transmitting information in a form readable by a machine (e.g., a computer). For instance, a machine-readable medium includes read only memory ("ROM"); random access memory ("RAM"); magnetic disk storage media; optical storage media; flash memory devices; and electrical, optical, acoustical or other form of propagated signals (e.g., carrier waves, infrared signals, digital signals, etc.), just to mention a few examples.

The methods illustrated throughout the specification, may be implemented in a computer program product that may be executed on a computer. The computer program product may comprise a non-transitory computer-readable recording medium on which a control program is recorded, such as a disk, hard drive, or the like. Common forms of non-transitory computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, or any other tangible medium from which a computer can read and use.

Alternatively, the method may be implemented in transitory media, such as a transmittable carrier wave in which the control program is embodied as a data signal using transmission media, such as acoustic or light waves, such as those generated during radio wave and infrared data communications, and the like.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

The exemplary embodiment has been described with reference to the preferred embodiments. Obviously, modifications and alterations will occur to others upon reading and understanding the preceding detailed description. It is intended that the exemplary embodiment be construed as including all such modifications and alterations insofar as they come within the scope of the appended claims or the equivalents thereof.

What is claimed is:

1. A non-transitory storage medium storing instructions readable and executable by an electronic processor to perform a ransomware attack (RWA) detection method comprising:

receiving incremental or differential backup metadata for a computer or network of computers via an electronic network, the incremental or differential backup metadata identifying files of the computer or network of computers which are new, modified, or deleted since a last incremental or last full backup of the computer or network of computers;

extracting file metadata from the received incremental or differential backup metadata for the files which are new or deleted since the last incremental or last full backup of the computer or network of computers;

identifying candidate new files and candidate deleted files in which the candidate new files are candidates for being encrypted copies of the candidate deleted files, the candidate new files and the candidate deleted files being identified using the extracted file metadata;

generating a RWA alert when the identified candidate new files and the candidate deleted files meet a RWA alert criterion computed using the extracted file metadata; and the RWA alert triggering a RWA remediation including at least disabling the computer or network of computers via the electronic network in response to the RWA alert when a RWA alert verification criterion is satisfied, wherein the RWA alert verification criterion is more than a predetermined threshold number or a fraction of sampled candidate new files being encrypted as indicated by an entropy analysis exceeding a verification threshold.

2. The non-transitory storage medium of claim 1 wherein the non-transitory storage medium further stores instructions readable and executable by the electronic processor to perform an incremental or differential backup method comprising:

via the electronic network, receiving file content including (i) copies of the files identified in the incremental or differential backup metadata as new since the last incremental or last full backup of the computer or network of computers and (ii) at least changes for the files identified in the incremental or differential backup metadata as modified since the last incremental or last full backup of the computer or network of computers; and updating a backup of the computer or network of computers stored on a data storage with the received file content.

3. The non-transitory storage medium of claim 2 wherein the identifying of the candidate new files and the candidate deleted files does not use the received file content.

4. The non-transitory storage medium of claim 1 wherein the identifying of candidate new files and candidate deleted files comprises identifying candidate pairs of new and deleted files based at least in part on a deletion timestamp of the deleted file of a candidate pair being later in time than a creation timestamp of the new file of the candidate pair.

5. The non-transitory storage medium of claim 1 wherein the identifying of candidate new files and candidate deleted files includes one of:

identifying candidate new and deleted files based at least in part on similarity of a sum of the file sizes of the new files and a sum of the file sizes of the deleted files; or identifying candidate pairs of new and deleted files based at least in part on similarity of a file size of the new file of a candidate pair and a file size of the deleted file of the candidate pair.

6. The non-transitory storage medium of claim 5 wherein the identifying of candidate new files and candidate deleted files comprises identifying candidate pairs of new and deleted files based at least in part on the new file of a candidate pair being larger than the deleted file of the candidate pair.

7. The non-transitory storage medium of claim 1 wherein the identifying of candidate new and candidate deleted files comprises identifying candidate pairs of new and deleted files based at least in part on a comparison of a file name of the new file of a candidate pair and a file name of the deleted file of the candidate pair.

8. The non-transitory storage medium of claim 1 wherein the identifying of candidate new and candidate deleted files comprises identifying candidate pairs of new and deleted files based at least in part on the new and deleted files of a candidate pair being in a same directory or folder of a hierarchical system of folders or directories of the computer or network of computers.

9. The non-transitory storage medium of claim 1 wherein the computer or network of computers employs a hierarchical system of folders or directories, and the identifying of candidate new and candidate deleted files is performed on a per-folder or per-directory basis.

10. The non-transitory storage medium of claim 9 wherein the identifying of candidate new and candidate deleted files comprises identifying candidate pairs of new and deleted files in a folder or directory based on one or more of:

a deletion timestamp of the deleted file of a candidate pair being later in time than a creation timestamp of the new file of the candidate pair;

similarity of a file size of the new file of a candidate pair and a file size of the deleted file of the candidate pair;

a file size of the new file of a candidate pair being larger than a file size of the deleted file of the candidate pair; and/or a comparison of a file name of the new file of the candidate pair and a file name of the deleted file of the candidate pair.

11. The non-transitory storage medium of claim 9 wherein the RWA alert is generated when the identified candidate new and candidate deleted files in at least one folder or directory of the hierarchical system of folders or directories satisfies the RWA alert criterion.

12. The non-transitory storage medium of claim 11 wherein the RWA alert is generated when the identified candidate new and candidate deleted files in a folder or directory satisfies a folder or directory RWA alert criterion computed using counts of the candidate new files and the candidate deleted files in the folder or directory.

13. The non-transitory storage medium of claim 12 wherein:

the extracting of the file metadata further includes extracting file metadata from the received incremental or differential backup metadata for the files which are modified since the last incremental or last full backup of the computer or network of computers; and the RWA alert criterion is further based on a count of the modified files in the folder or directory being less than or equal to a maximum modified files count threshold.

14. The non-transitory storage medium of claim 13 wherein the maximum modified files count threshold is zero.

15. The non-transitory storage medium of claim 13 wherein the folder or directory RWA alert criterion further includes at least:

similarity of a sum of file sizes of the candidate new files in the folder or directory and a sum of file sizes of the candidate deleted files in the folder or directory.

16. A ransomware attack (RWA) detection method performed by a backup system including an electronic processor, the RWA detection method comprising:

receiving incremental or differential backup metadata for a computer or network of computers via an electronic network, the incremental or differential backup metadata identifying files of the computer or network of computers which are new, modified, or deleted since a last incremental or last full backup of the computer or network of computers;

via the electronic network, receiving file content including (i) copies of the files identified in the incremental or differential backup metadata as new since the last incremental or last full backup of the computer or network of computers and (ii) at least changes for the files identified in the incremental or differential backup metadata as modified since the last incremental or last full backup of the computer or network of computers;

extracting file metadata from the received incremental or differential backup metadata for the files which are new or deleted since the last incremental or last full backup of the computer or network of computers;

identifying candidate new files and candidate deleted files in which the candidate new files are candidates for being encrypted copies of the candidate deleted files, the candidate new and candidate deleted files being identified using the extracted file metadata and not using the received file content; and performing RWA remediation including at least disabling the computer or network of computers via the electronic network in response to:
(i) the identified candidate new and candidate deleted files meeting a RWA alert criterion, and
(ii) the identified candidate new and candidate deleted files meeting the RWA alert criterion and a RWA verification subsequently performed on the received file content of at least a sample of the candidate new files, wherein the RWA verification criterion is more than a predetermined threshold number or a fraction of sampled candidate new files being encrypted as indicated by an entropy analysis exceeding a verification threshold.

17. The RWA detection method of claim 16 wherein:
the computer or network of computers employs a hierarchical system of folders or directories; and
the identifying of candidate new and candidate deleted files is performed on a per-folder or per-directory basis; and
the RWA alert criterion is applied on a per-folder or per-directory basis.

18. The RWA detection method of claim 17 wherein the RWA alert criterion applied to a folder or directory is based at least on:
similarity of a count of the candidate new files in the folder or directory and a count of the candidate deleted files in the folder or directory; and
similarity of a sum of file sizes of the candidate new files in the folder or directory and a sum of file sizes of the candidate deleted files in the folder or directory.

19. The RWA detection method of claim 17 wherein the identifying of candidate new and candidate deleted files in a folder or directory includes identifying candidate pairs of new and deleted files in which the candidate new file of each pair is a candidate for being an encrypted copy of the candidate deleted file of the pair.

20. The RWA detection method of claim 19 wherein the identifying of candidate pairs of new and deleted files is based on one or more of:
a deletion timestamp of the deleted file of a candidate pair being later in time than a creation timestamp of the new file of the candidate pair;
similarity of a file size of the new file of a candidate pair and a file size of the deleted file of the candidate pair;
a file size of the new file of a candidate pair being larger than a file size of the deleted file of the candidate pair; and/or
a comparison of a file name of the new file of the candidate pair and a file name of the deleted file of the candidate pair.

21. A backup system comprising:
an electronic processor operatively connected with a cloud data storage; and
a non-transitory storage medium storing:
backup instructions readable and executable by the electronic processor to perform an incremental or differential backup of a system of folders or directories of a computer or network of computers via an electronic network; and
ransomware attack (RWA) detection instructions readable and executable by the electronic processor to perform RWA detection operations including:
processing incremental or differential backup metadata acquired during the incremental or differential backup to determine whether a RWA alert is issued wherein the processing does not use the file content;
in response to the RWA alert being issued, performing a RWA verification comprising encryption detection performed on file content of at least a sample of the candidate new files received during the incremental or differential backup; and
performing RWA remediation including at least disabling the computer or network of computers via the electronic network based on the RWA alert being issued and the RWA verification meeting a RWA verification criterion.

22. The backup system of claim 21 wherein the processing of the incremental or differential backup metadata to determine whether a RWA alert is issued includes:
processing the incremental or differential backup metadata to identify one or more folders or directories that contain candidate new files and candidate deleted files in which the candidate new files are candidates for being encrypted copies of the candidate deleted files, the candidate new and deleted files being identified without using file content; and
issuing the RWA alert based at least in part on at least one folder or directory containing candidate new and candidate deleted files meeting a RWA alert criterion.

* * * * *